(12) United States Patent
Junk

(10) Patent No.: US 11,792,000 B2
(45) Date of Patent: *Oct. 17, 2023

(54) METHODS AND APPARATUS TO BROADCAST DATA PACKETS IN A PROCESS CONTROL ENVIRONMENT

(71) Applicant: Fisher Controls International LLC, Marshalltown, IA (US)

(72) Inventor: Kenneth William Junk, Marshalltown, IA (US)

(73) Assignee: FISHER CONTROLS INTERNATIONAL LLC, Marshalltown, IA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/751,458

(22) Filed: May 23, 2022

(65) Prior Publication Data

US 2022/0286278 A1    Sep. 8, 2022

Related U.S. Application Data

(63) Continuation of application No. 16/271,422, filed on Feb. 8, 2019, now Pat. No. 11,343,093.

(51) Int. Cl.
*H04L 29/06* (2006.01)
*H04L 9/08* (2006.01)
(Continued)

(52) U.S. Cl.
CPC .......... *H04L 9/088* (2013.01); *G05B 19/042* (2013.01); *G05B 2219/25205* (2013.01); *H04W 4/80* (2018.02)

(58) Field of Classification Search
CPC ........ H04L 9/088; H04W 4/80; G05B 19/042; G05B 2219/25205
(Continued)

(56) References Cited

U.S. PATENT DOCUMENTS 11,343,093 B2    5/2022  Junk
2010/0190442 A1*  7/2010  Citrano, III ........ G05B 19/4185
455/41.2

(Continued)

FOREIGN PATENT DOCUMENTS

DE    102014106727    11/2015
EP    3255906    12/2017

OTHER PUBLICATIONS

International Searching Authority, "International Search Report", issued in connection with International Application No. PCT/US2018/053497, dated Jan. 10, 2019, 6 pages.

(Continued)

*Primary Examiner* — Evans Desrosiers
(74) *Attorney, Agent, or Firm* — HANLEY, FLIGHT & ZIMMERMAN, LLC

(57) ABSTRACT

An example method to obtain process data associated with a process control system received from a field device includes identifying, at a computing device, associated data and a payload included in the data packet, the associated data including a source bit, determining, at the computing device, a type of connection between the field device and the computing device based on the source bit, determining, at the computing device, an encryption key identifier and an initialization vector based on an auxiliary data packet received prior to the data packet, generating, at the computing device, a nonce value based on the source bit and the initialization vector, the nonce value indicative of an input to a data encryption algorithm used by the field device to encrypt the payload, and extracting, at the computing device, the process data associated with the process control system from the payload.

20 Claims, 17 Drawing Sheets

(51) Int. Cl.
*G05B 19/042* (2006.01)
*H04W 4/80* (2018.01)

(58) Field of Classification Search
USPC .......................................................... 713/171
See application file for complete search history.

(56) References Cited

U.S. PATENT DOCUMENTS

| 2011/0025827 | A1* | 2/2011 | Shpunt | ..................... | H04N 5/33 |
| | | | | | 348/46 |
| 2014/0304505 | A1* | 10/2014 | Dawson | .............. | G06F 21/6227 |
| | | | | | 713/165 |
| 2020/0153813 | A1* | 5/2020 | Wu | ........................... | H04L 9/14 |

OTHER PUBLICATIONS

International Searching Authority, "Written opinion", issued in connection with International Application No. PCT/US2018/053497, dated Jan. 10, 2019, 8 pages.
United States Patent and Trademark Office, "Notice of Allowance and Fee(s) Due", issued in connection with U.S. Appl. No. 16/271,422, filed Jan. 20, 2022, 9 pages.

* cited by examiner 13-byte nonce in little endian format for AES-256-CCM

| Byte | Field | Description |
|---|---|---|
| 0 | Nonce 0 | Byte 0 of Counter (LSB) |
| 1 | Nonce 2 | Byte 1 of Counter |
| 2 | Nonce 3 | Byte 2 of Counter (MSB) |
| 3 | Nonce 4 | Bit 6 = Source<br>Bit 7 = Direction |
| 4 | Nonce 5 | Byte 0 of IV (LSB) |
| 5 | Nonce 5 | Byte 1 of IV |
| ... | ... | ... |
| 11 | Nonce 11 | Byte 7 of IV |
| 12 | Nonce 12 | Byte 8 of IV (MSB) |

FIG. 7 ed according to BLE
communication protocols is not compatible with data for-
matted according to the above-described industrial commu-
nication protocols.

METHODS AND APPARATUS TO BROADCAST DATA PACKETS IN A PROCESS CONTROL ENVIRONMENT

RELATED APPLICATIONS

This patent arises from a continuation of U.S. patent application Ser. No. 16/271,422, now U.S. Pat. No. 11,343,093, filed on Feb. 8, 2019. U.S. patent application Ser. No. 16/271,422 is hereby incorporated herein by reference in its entirety.

FIELD OF THE DISCLOSURE

This disclosure relates generally to process control systems and, more particularly, to methods and apparatus to broadcast data packets in a process control environment.

BACKGROUND

Industrial communication protocols are implemented to manage industrial process control operations associated with field devices and other types of process equipment located in industrial process control environments. Examples of such industrial communication protocols include the Highway Addressable Remote Transducer (HART) communication protocol, the PROFIBUS communication protocol, the FOUNDATION Fieldbus communication protocol, the MODBUS communication protocol, etc.

Bluetooth Low Energy (BLE) communication protocols are implemented as wireless personal area network communication protocols that facilitate wireless communications between BLE-compatible devices. Examples of such BLE-compatible devices include desktop computers, laptop computers, tablets, smartphones, and personal digital assistants (PDAs). Conventionally, data formatted according to BLE communication protocols is not compatible with data formatted according to the above-described industrial communication protocols.

SUMMARY

Methods and apparatus to broadcast data packets in a process control environment are disclosed herein. An example method to transmit process data associated with a process control system to a remote device includes, in response to receiving, from a field device microcontroller, a byte array including process data, determining whether auxiliary data is to be transmitted from a field device based on a counter, the auxiliary data including an encryption key identifier and an initialization vector, when auxiliary data is to be transmitted, transmitting a first data packet including the auxiliary data to the remote device, and determining a value for a source bit based on a type of connection between the field device and the remote device, the source bit and the counter included in associated data. The method further includes generating a nonce value based on the source bit and the initialization vector, encrypting a payload including the byte array based on the encryption key identifier and the nonce value, and transmitting a second data packet to the remote device, the second data packet including the associated data and the encrypted payload.

An example apparatus to transmit process data associated with a process control system to a remote device includes a security manager to, in response to receiving, from a field device microcontroller, a byte array including process data, determining whether auxiliary data is to be transmitted from a field device based on a counter, the auxiliary data including an encryption key identifier and an initialization vector, when auxiliary data is to be transmitted, transmit a first data packet including the auxiliary data to the remote device, determine a value for a source bit based on a type of connection between the field device and the remote device, the source bit and the counter included in associated data, generate a nonce value based on the source bit and the initialization vector, and encrypt a payload including the byte array based on the encryption key identifier included and the nonce value. The apparatus further includes a Bluetooth low energy (BLE) interface to transmit a second data packet to the remote device, the second data packet including the associated data and the encrypted payload.

An example tangible computer readable storage medium comprising instructions that, when executed, cause a field device to transmit process data associated with a process control system to a remote device, the field device to at least, in response to receiving, from a field device microcontroller, a byte array including process data, determine whether auxiliary data is to be transmitted from a field device based on a counter, the auxiliary data including an encryption key identifier and an initialization vector, when auxiliary data is to be transmitted, transmit a first data packet including the auxiliary data to the remote device, and determine a value for a source bit based on a type of connection between the field device and the remote device, the source bit and the counter included in associated data. The instructions further cause the field device to generate a nonce value based on the source bit and the initialization vector, encrypt a payload including the byte array based on the encryption key identifier and the nonce value, and transmit a second data packet to the remote device, the second data packet including the associated data and the encrypted payload.

Another example method to obtain process data associated with a process control system received from a field device includes, in response to receiving a data packet, identifying, at a computing device, associated data and a payload included in the data packet, the associated data including a source bit, determining, at the computing device, a type of connection between the field device and the computing device based on the source bit, and determining, at the computing device, an encryption key identifier and an initialization vector based on an auxiliary data packet received prior to the data packet. The method further includes generating, at the computing device, a nonce value based on the source bit and the initialization vector, the nonce value indicative of an input to a data encryption algorithm used by the field device to encrypt the payload, and extracting, at the computing device, the process data associated with the process control system from the payload using the data encryption algorithm based on the encryption key identifier and the nonce value.

Another example tangible computer readable storage medium comprising instructions that, when executed, cause a computing device to obtain process data associated with a process control system received from a field device, the computing device to at least, in response to receiving a data packet, identify associated data and a payload included in the data packet, the payload including process data associated with a process control system, the associated data including a source bit, determine a type of connection between the field device and the computing device based on the source bit, and determine an encryption key identifier and an initialization vector based on an auxiliary data packet received prior to the data packet. The instructions are further to generate a nonce value based on the source bit and the initialization vector, the nonce value indicative of an input to a data encryption algorithm used by the field device to encrypt the payload, and extract the process data associated with the process control system from the payload using the data encryption algorithm based on the encryption key identifier and the nonce value.

An example system to obtain process data associated with a process control system received form a field device includes a field device to broadcast a data packet including a payload and associated data, the payload including process data associated with a process control system, the associated data including a source bit. The system further includes a computing device to, in response to receiving the data packet, identify the source bit and the payload included in the data packet, determine a type of connection between the field device and the computing device based on the source bit, and determine an encryption key identifier and an initialization vector based on an auxiliary data packet received prior to the data packet. The computing device is further to generate a nonce value based on the source bit and the initialization vector, the nonce value indicative of an input to a data encryption algorithm used by the field device to encrypt the payload, and extract the process data associated with the process control system from the payload using the data encryption algorithm based on the encryption key identifier and the nonce value.

BRIEF DESCRIPTION OF THE DRAWINGS

FIG. 7 is an implementation of an example nonce value generated by the example field device of FIGS. 1-4 and/or the example remote device of FIGS. 1, 3, and/or 4.

The figures are not to scale. Wherever possible, the same reference numbers will be used throughout the drawing(s) and accompanying written description to refer to the same or like parts.

DETAILED DESCRIPTION

Figure 1:
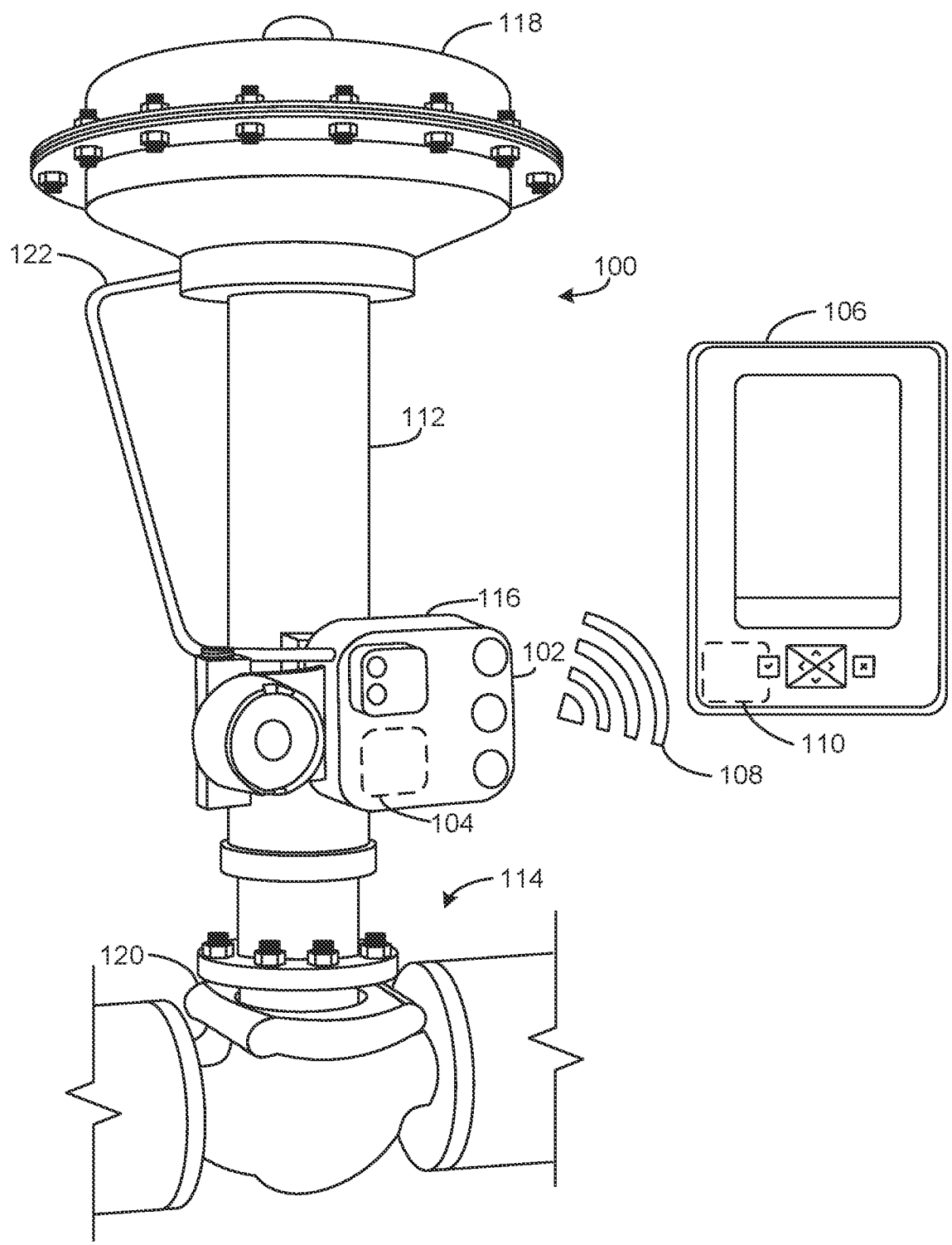
FIG. 1 is a schematic illustration of an example environment including an example field device having an example network bridge to bridge communications between the field device and an example remote device over an example BLE network in accordance with the teachings of this disclosure.

In recent years, Bluetooth® technology has become increasingly utilized in industrial applications to facilitate communication between devices. Bluetooth is a wireless technology standard for exchanging data over short distances using short-wavelength ultra-high frequency radio waves in the industrial, scientific, and medical (ISM) radio bands (e.g., 2.4 to 2.4835 GHz). Conventional methods of implementing Bluetooth in industrial applications such as process control systems include communicatively coupling an industrial protocol communicator such as a Highway Addressable Remote Transducer (HART) modem to a typical Bluetooth radio (e.g., a Bluetooth radio that operates based on the Bluetooth Core Specification Version 5.0). For example, a field device (e.g., a field device with a sufficient power budget to operate a Bluetooth radio) may encapsulate HART information within a Bluetooth packet and transmit the Bluetooth packet to a remote client, where the remote client receives the information via a typical Bluetooth radio communicatively coupled to a main processor via a bus.

Bluetooth Low Energy (Bluetooth LE or BLE) is a wireless communication technology based on standard Bluetooth technology (e.g., operates in the same spectrum range of 2.4-2.4835 GHz ISM band) intended to provide considerably reduced power consumption and cost while maintaining a communication range similar to that of classic Bluetooth. BLE is different from and is not compatible with classic Bluetooth. For example, BLE uses a different set of channels compared to classic Bluetooth. In such an example, BLE may have 40 2-MHz channels compared to classic Bluetooth's 79 1-MHz channels. In another example, BLE does not support Serial Port Profile (SPP), which is used to replace a serial communication interface (e.g., RS-232 communication, RS-485 communication, etc.).

Examples disclosed herein use BLE to form a communication bridge between one or more low-powered devices to improve interoperability of communication, reduce cost and complexity of performing the communication, and to increase a speed of the communication between the devices. In some disclosed examples, the BLE bridge apparatus facilitates communication between one or more client devices (e.g., an Emerson AMS TREX™) and a server device (e.g., a field device, a controller, a valve positioner, etc.). For example, the BLE bridge apparatus may be coupled and/or communicatively coupled to a field device such as a local controller, a headless controller (e.g., a PLC-type device), a valve positioner, a pressure transmitter, a temperature transmitter, a level transmitter, etc. For example, the BLE bridge apparatus may be used to establish peer-to-peer communications with one or more client devices, one or more field devices, etc., and/or a combination thereof.

In some disclosed examples, the field device is communicatively coupled to one or more remote devices (e.g., computing devices) such as the Emerson AMS Trex. For example, the remote device may be a computing device including a process control related software application operating on a standard operating system (e.g., a Windows™-based operating system, an Apple macOS® operating system, an Android™ operating system, a Linux® operating system, etc.). In such an example, the remote device may communicate to the field device via BLE.

In some disclosed examples, the BLE bridge apparatus facilitates a transmission of information from the field device to the remote device. The field device may support an industrial communication protocol such as HART protocol. For example, the HART protocol defines a data packet to be structured based on the Bell 202 Modem Standard. As a result, HART data packet supporting information (e.g., a HART preamble, a HART address, etc.) does not need to be sent to the remote device via BLE. For example, the HART preamble is used for carrier detection and synchronization per the Bell 202 Modem Standard and does not need to be included in the BLE data packet because there are no Bell 202 modems to detect or synchronize. For example, the BLE bridge apparatus may receive a HART protocol data packet from the field device, remove HART protocol information from the HART protocol data packet, and transmit payload data (e.g., transmit only payload data) of the HART protocol data packet to the remote device via BLE. In such an example, the remote device may reconstruct the HART protocol data packet including the payload data and transmit the reconstructed HART protocol data packet to an application operating on the remote device.

In some examples, the BLE bridge of the field device encrypts the payload data and/or adds a message authentication code (MAC) to the data packet prior to transmission to the remote device. For example, the field device BLE bridge may encrypt the payload of a data packet using an encryption algorithm, such as an AES-128 Block Cipher, to encrypt the packet. In such an example, the field device BLE bridge uses an encryption key and a nonce value as inputs to the encryption algorithm. For example, the encryption key may be a pre-shared key that is accessible by the field device BLE bridge (e.g., stored at the field device, stored on separate hardware, etc.). In some examples, the nonce value is a unique value generated based on characteristics of the transmission of the data packet and/or other values transmitted from the field device BLE bridge to the remote device as auxiliary data (e.g., in a separate data packet). For example, the nonce value may be generated by the field device BLE bridge based on a source bit, indicative of a type of transmission of the data packet (e.g., broadcast transmission, direct connection data transmission, etc.) and an initialization vector (e.g., generated by the field device BLE bridge). Additionally or alternatively, the field device BLE bridge may authenticate the data packet. For example, the field device BLE bridge can authenticate (e.g., using a MAC) the payload and associated data (e.g., flags, a counter, etc.) included in the data packet and can further encrypt the payload and/or the MAC. In some such examples, the encryption of the MAC generates a message integrity check (MIC) that is transmitted within the data packet. In some examples, the field device BLE bridge may authenticate an unencrypted payload and transmit the data packet having the authenticated payload.

In some examples, the authentication of the data packet includes generating a MAC and appending the MAC to the payload. For example, the field device BLE bridge may generate the MAC using a cipher block chaining message authentication code (CBC-MAC) block cipher. Additionally or alternatively, the field device BLE bridge may generate the MAC based on other hashing algorithms or functions (e.g., HMAC) or additional block ciphers. Further, in some examples, the MAC is encrypted to generate a MIC prior to transmission of the data packet. In some examples, when the data packet has been encrypted and/or authenticated, the field device BLE bridge transmits the data packet over a BLE network. In some such examples, the data packet includes associated data in addition to the payload that provides information used to decrypt and/or authenticate the payload of the data packet. In some examples, the data packet is received by other devices (e.g., remote devices) that can authenticate and/or decrypt the payload to access process data within the payload (e.g., if the other devices have the required information, such as the encryption key identifier, the source bit, etc.).

In some disclosed examples, a remote device includes a remote device BLE bridge that can receive, authenticate, and/or decrypt the payload of the data packet. In some examples, the remote device accesses associated data included in the data packet. In some such examples, the header data includes a source bit and a direction bit. In such examples, the remote device determines a type of connection (e.g., broadcast transmission) between the field device and the remote device based on the source bit and determines a direction of transmission (e.g., from the field device to the remote device) based on the direction bit. In some examples, the remote device BLE bridge further receives an encryption key identifier and initialization vector in auxiliary information. For example, data packets including auxiliary information (e.g., data used to decrypt, authenticate, and/or process the data packets, including an encryption key identifier, an initialization vector, and/or device information) may be interlaced between data packets including process data to provide the remote device with information used to decrypt and/or authenticate payloads within future data packets. In such examples, the encryption key identifier identifies a pre-shared encryption key used by the field device BLE bridge to encrypt and/or authenticate the payload of the data packet based on an encryption key identifier included in the auxiliary information. In some examples, the remote device BLE bridge further generates a nonce value based on the source bit and the initialization vector and inputs the nonce value and the encryption key into an encryption algorithm to decrypt an encrypted payload. Additionally or alternatively, the remote device BLE bridge inputs the nonce value and the encryption key into an algorithm to generate the MAC used to authenticate the payload and the header data of the data packet. Thus, when the data packet has been authenticated and/or the payload has been decrypted, the remote device BLE bridge is able to extract process data (e.g., process data associated with a process control system) from the payload.

In some disclosed examples, the field device BLE bridge facilitates a transmission of information from a remote device BLE bridge of the remote device to the field device. The example field device BLE bridge may identify one or more protocols supported by the field device. In response to receiving a receive request from the remote device BLE bridge, the field device BLE bridge determines whether the receive request corresponds to a protocol supported by the field device. In response to determining that the receive request corresponds to a supported protocol, the field device BLE bridge approves the receive request and receives one or more data packets from the remote device. The example field device BLE bridge removes BLE information from the received data packet(s), accesses the payload data using a nonce value generated using associated data of the data packet and auxiliary data (e.g., as described above), and adds supported-protocol information (e.g., a HART protocol preamble, a HART protocol address, etc.) to the received data packets. The field device BLE bridge further transmits the processed data packets to a microcontroller unit (MCU) of the field device via a UART terminal, an I2C bus, an SPI bus, etc. For example, the MCU may be a processor executing one or more process control operations (e.g., measuring a valve position, transmitting information via an industrial communication protocol, etc.) of the field device. In some disclosed examples, the field device BLE bridge removes BLE information from a data packet received from the remote device, accesses the payload data, and transmits the data packet to the MCU of the field device without adding supported-protocol information to the data packet.

Examples disclosed herein improve communication interoperability between devices because the BLE bridge apparatus can facilitate communication between (1) a field device using a conventional industrial communication protocol and (2) a remote device via BLE. Examples disclosed herein reduce cost and complexity because the BLE bridge apparatus can facilitate communication between field devices without additional specialized hardware to perform communication translation and transmission (e.g., an external communication gateway device and corresponding hardware such as a power supply, a circuit breaker, an enclosure, etc.). Examples disclosed herein can be implemented in a software application layer above the physical hardware layer of a BLE radio (e.g., a BLE transceiver) in a remote device. As a result, examples disclosed herein can improve interoperability between the remote device and the field device as the remote device can use any conventional operating system and any conventional BLE radio.

Known methods of Bluetooth or BLE communication (e.g., Bluetooth beacons) are subject to security concerns, such as interception of the beacon or manipulation of the data included within the beacon because any device having a Bluetooth radio is capable of receiving and accessing the data within the beacon. Accordingly, methods for authorizing a device (e.g., a remote device) to access the transmitted information and encrypting data included in a data packet are desired for communications of data packets over a BLE network. Examples disclosed herein improve the security of wireless broadcast data transmission over a BLE network in process control environments by ensuring that the correct recipients (e.g., specific clients) are the only entities authorized to receive and access the broadcast data. For example, process control environments may include multiple clients, each having client-specific field devices. In such examples, the client field device(s) may transmit proprietary information from a field device associated with the client to a remote device associated with the same client. This proprietary information is to be transferred securely and is not to be accessible by other clients within the process control system or other clients associated with other portions of the process control system. The examples disclosed herein protect such proprietary information while maintaining the ease and range of transmission over the BLE network.

Such increased security of broadcast transmissions within a process control system provides a new kind of process that enables a field device to transmit information in a way that the field device could not before. For example, the examples disclosed herein allow an authenticated and/or encrypted data packet transmitted from a field device to be received over a wireless network (e.g., a BLE network) by a remote device that further authenticates and/or decrypts the payload of the data. When a remote device does not have the required information to authenticate or decrypt the data packet (e.g., the device is not authorized by the field device), the remote device cannot access the process data. Thus, only intended and/or authorized recipients of the data packets can access the payload of the data packets, and those devices that are not authorized cannot access the broadcast data packets (e.g., other clients in the process control environment). Such a method of securely broadcasting data in a process control environment provides secure communication to a wide range of devices while avoiding the problems of extensibility, interoperability, continuous maintenance, etc., that are typically encountered when using BLE.

The examples disclosed herein provide improvements in extensibility and interoperability. For example, the broadcast transmissions can be received by and transmitted from devices using any operating system (e.g., Microsoft, iOS, etc.) and are thus not limited to devices using the same operating system. The examples disclosed herein further do not require tables (e.g., look-up tables typically used for Bluetooth Low Energy communication) to be distributed, updated, and maintained across all devices in the process control system because the data is transmitted as plaintext, authenticated plaintext, and/or encrypted plaintext. For example, known look-up tables that maintain alerts and/or alarms used in the process control system require continuous updates that make maintenance of the alert and alarm tables impractical. The examples disclosed herein eliminate the need for such tables, thereby reducing the storage space required to maintain the tables and precluding the need for constant updates and maintenance.

FIG. 1 is a schematic illustration of an example environment 100 including an example field device 102 having an example network bridge 104 such as an example BLE bridge to bridge communications between the field device 102 and an example remote device 106 over an example BLE network 108. In some examples, the remote device 106 is a computing device, such as the Emerson AMS Trex. For example, the remote device may be a computing device including a process control related software application operating on a standard operating system (e.g., a Windows™-based operating system, an Apple macOS® operating system, an Android™ operating system, a Linux® operating system, etc.). The remote device 106 of the illustrated example includes a remote device BLE bridge 110 to receive communications from the field device 102 and further to transmit communications to the field device 102. In the illustrated example, the field device 102 is coupled to a fluid flow control assembly 112 operating in a process control environment 114. The fluid flow control assembly 112 of the illustrated example is a pneumatically actuated valve assembly.

In the illustrated example, an enclosure 116 of the field device 102 containing the network bridge 104 is coupled to the fluid flow control assembly 112, which includes at least an actuator 118 and a valve 120 (e.g., a butterfly valve, a globe valve, etc.). The actuator 118 of the illustrated example is activated via changes in pneumatic pressure from a pneumatic tube connection 122. However, other valve assemblies may additionally or alternatively be used, such as an electrically actuated valve assembly, a hydraulically actuated valve assembly, etc. Although the example field device BLE bridge 104 is included in the enclosure 116 in the illustrated example, alternatively the example field device BLE bridge 104 may be located elsewhere.

In the illustrated example, the field device 102 is a valve controller. Alternatively, the example field device 102 may be a pressure transmitter, a temperature transmitter, a level transmitter, a pH transmitter, valve positioner, etc. The field device 102 of the illustrated example controls, measures and/or monitors one or more process control operation(s) associated with the fluid flow control assembly 112. For example, the field device 102 may be implemented as a controller that controls, measures and/or monitors the operation of the actuator 118 operatively coupled to the valve 120 and transmits the information corresponding to the operation to an external device such as the remote device 106. In such an example, the controller may control the operation of the actuator 118 and/or the position of the valve 120 (e.g., the extent to which the valve is opened or closed via the actuator 118).

In the illustrated example, the field device 102 controls, measures and/or monitors the one or more process control operation(s) associated with the fluid flow control assembly 112 (e.g., opens the valve 120, calibrates the valve 120, etc.) based on data (e.g., control commands, control signals, etc.) formatted according to an industrial communication protocol and communicated to and/or from the field device 102 over an industrial communication network. In some examples, the industrial communication protocol can be one of a HART communication protocol, a PROFIBUS communication protocol, a FOUNDATION Fieldbus communication protocol, or a MODBUS communication protocol.

In the illustrated example, the field device 102 communicates with the remote device 106 using the field device BLE bridge 104 via the BLE network 108. In the illustrated example, an antenna is embedded in a front panel of the field device 102 (e.g., in a front panel of the enclosure 116). In some examples, the field device 102 communicates field device information to the remote device 106 such as process control parameters corresponding to the fluid flow control assembly 112 (e.g., an actuator pressure, a supply pressure, a valve position, etc.). In some examples, the field device 102 communicates field device information to the remote device 106 such as configuration information, diagnostic information, etc., of the field device 102 (e.g., an identity of users logged-in to the field device 102, an internal event log, a calibration version of the controller, a firmware version of the controller, a model number of the fluid flow control assembly 112, etc.). In some examples, the field device 102 communicates field device information to the remote device 106 such as alert information (e.g., a calibration error, a missing position feedback alert, a low supply pressure alarm, a security exception, a security exception using a port of the BLE radio, etc.).

In some examples, the remote device BLE bridge 110 of the remote device 106 communicates information to the field device 102 using the field device BLE bridge 104 via the BLE network 108. For example, the remote device 106 may obtain configuration information from the field device 102 such as a firmware version of the controller. In response to the remote device 106 determining that the firmware version is not current, the remote device 106 may download a current version of the firmware to the field device 102. In another example, the remote device 106 may configure one or more parameters of the fluid flow control assembly 112 via the BLE network 108. For example, the remote device 106 may adjust an overpressure alarm setting, a unit of measure parameter, a process control variable minimum and/or maximum range setting, etc.

Performing such actions (e.g., downloading firmware, changing a setting, calibrating the field device 102, etc.) wirelessly reduces a complexity of performing operations (e.g., maintenance operations) on the fluid flow control assembly 112. For example, in absence of the BLE network 108, a hot work permit may need to be obtained to open the enclosure 116 to access the controller. In another example, process control operations in the process control environment 114 may need to be shut down prior to performing work on the field device 102 to prevent potential electric sparks from causing an explosion in a hazardous gas atmosphere. The example field device BLE bridge 104 and the remote device BLE bridge 110 reduce complexity of maintenance operations by facilitating communication between the field device 102 and the remote device 106 via the BLE network 108.

Figure 2:
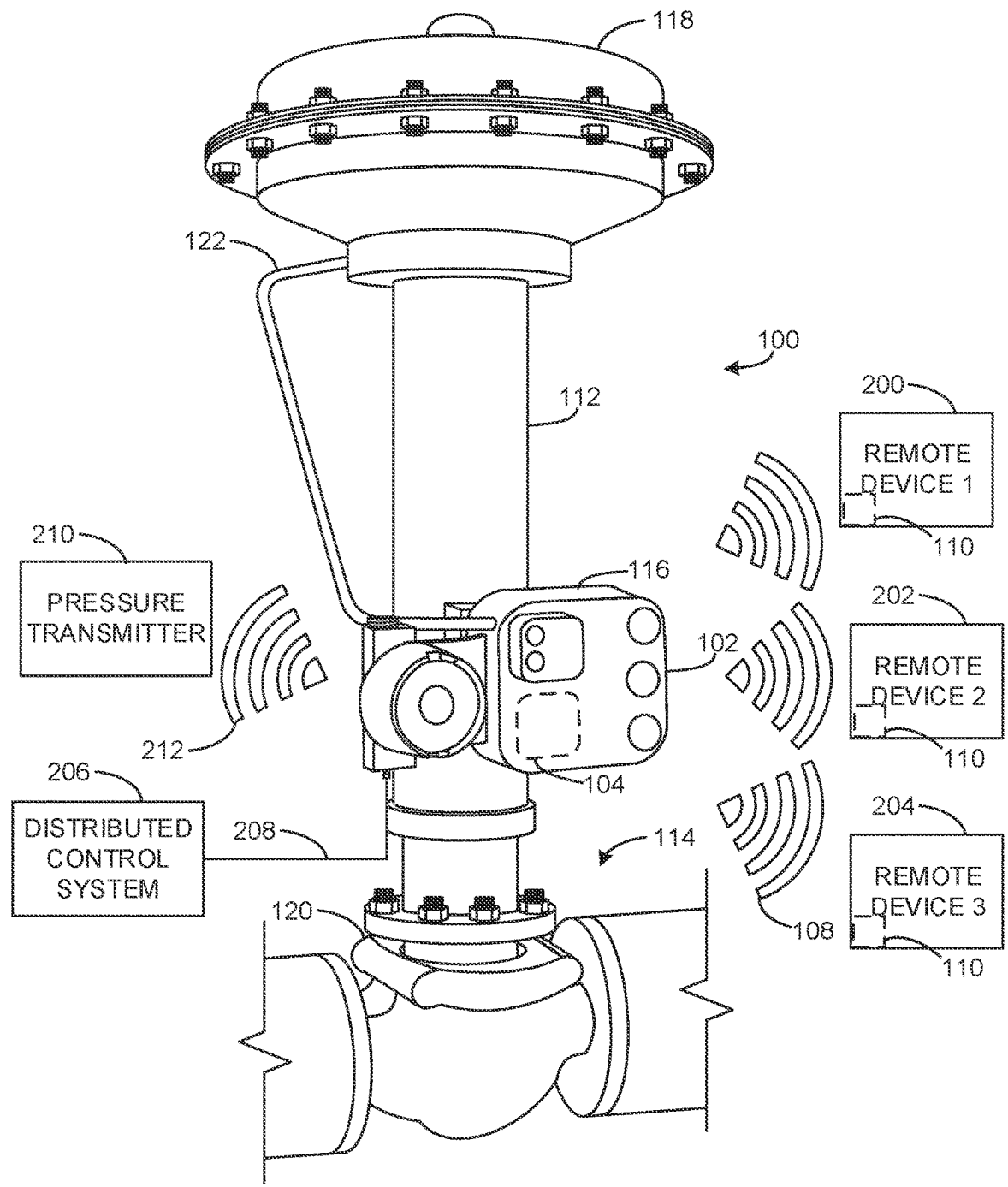
FIG. 2 is another schematic illustration of the example environment of FIG. 1 including the example field device of FIG. 1 having an example network bridge to bridge communications between the field device and first through third example remote devices over an example BLE network in accordance with the teachings of this disclosure.

FIG. 2 is another schematic illustration of the example environment 100 of FIG. 1 including the example field device 102 of FIG. 1 having the example field device BLE bridge 104 of FIG. 1 to bridge communications between Remote Device 1 200, Remote Device 2 202, and Remote Device 3 204. In the illustrated example, the field device BLE bridge 104 processes (e.g., is capable of processing, capable of simultaneously processing, etc.) multiple BLE communication connections between the field device 102 and the Remote Devices 1-3 200, 202, 204. In some examples, one or more of the Remote Devices 1-3 200, 202, 204 include the example remote device BLE bridge 110 of FIG. 1. For example, the field device 102 may transmit field device information to one or more of the Remote Devices 1-3 200, 202, 204 and/or receive information (e.g., a firmware executable, a configuration setting, etc.) from one or more of the Remote Devices 1-3 200, 202, 204. Although only the Remote Devices 1-3 200, 202, 204 are depicted in FIG. 2, fewer or more than the Remote Devices 1-3 200, 202, 204 may be used.

In the illustrated example, the field device 102 is communicatively coupled to a distributed control system (DCS) 206. For example, the DCS 206 may include one or more data acquisition and control systems including one or more controllers. The field device 102 of the illustrated example is communicatively coupled to the DCS 206 via a cable or other hardwired connection 208 that includes one or more wires. Additionally or alternatively, the example field device 102 may be connected to the DCS 206 via a wireless connection. For example, the field device 102 may communicate with the DCS 206 via the cable 208, a WirelessHART (WiHART) connection, a Wi-Fi Direct® network, etc., and/or a combination thereof. Alternatively, the example field device 102 may communicate with one or more of the Remote Devices 1-3 200, 202, 204 via the field device BLE bridge 104 while not being communicatively coupled to the DCS 206.

In the illustrated example, the field device 102 is communicatively coupled to a pressure transmitter 210 via a wireless connection 212. For example, the pressure transmitter may be a ROSEMOUNT™ 30515 Wireless Differential Pressure Flow Transmitter. Alternatively, the pressure transmitter 210 may be any other type of field device such as a flow rate transmitter, a temperature transmitter, a valve positioner, etc. The wireless connection 212 of the illustrated example is a WiHART connection. Alternatively, any other wireless connection may be used. In the illustrated example, the field device 102 transmits information to the pressure transmitter 210 and receives information from the pressure transmitter 210. For example, the pressure transmitter 210 may transmit information (e.g., a pressure measurement, a diagnostic of the pressure transmitter 210, a configuration parameter of the pressure transmitter 210, etc.) to the field device 102.

Figure 3:
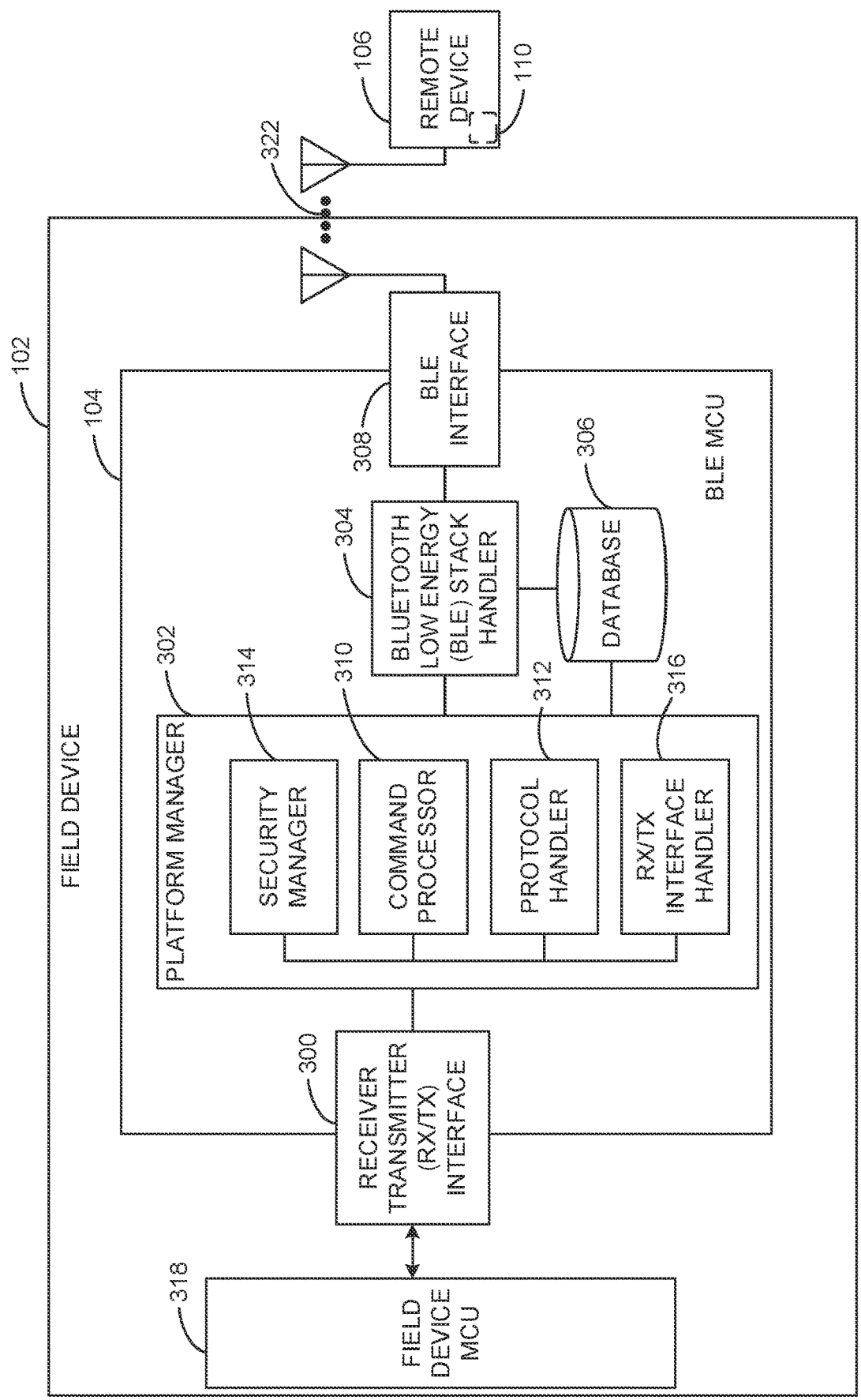
FIG. 3 is a block diagram of an example implementation of the field device BLE bridge apparatus of FIGS. 1-2 included in the example field device of FIGS. 1-2.

FIG. 3 is a block diagram of an example implementation of the BLE bridge apparatus of FIGS. 1-2 including the example field device 102 and the example field device BLE bridge 104 of FIGS. 1-2. In the illustrated example, the field device BLE bridge 104 includes an example receiver transmitter (RX/TX) interface 300, an example platform manager 302, an example Bluetooth Low Energy (BLE) stack handler 304, an example database 306, and an example BLE interface 308. The platform manager 302 of the illustrated example includes an example command processor 310, an example protocol handler 312, and an example security manager 314, and an RX/TX interface handler 316. Further shown are an example field device MCU 318, the example remote device 106, and an example BLE network 322.

In the illustrated example of FIG. 3, the field device BLE bridge 104 is a microcontroller (MCU) used to execute communication operations between the field device MCU 318 and an external BLE-compatible device such as the remote device 106. The BLE interface 308 of the illustrated example facilitates BLE communication via the BLE network 322. The field device BLE bridge 104 of the illustrated example is included in the field device 102. Alternatively, the field device BLE bridge 104 may not be included in the field device 102, where the field device BLE bridge 104 is communicatively coupled to the field device 102 via a cable or other communication means. In some examples, data packets transmitted from the field device MCU 318 to the field device BLE bridge 104 are in a format defined by an industrial communication protocol supported by the field device 102. For example, the field device 102 may support HART protocol. In such an example, the field device MCU 318 may transmit data packets to the Field device BLE bridge 104 via the receiver transmitter interface 300 in a HART protocol format.

In the illustrated example, the field device BLE bridge 104 includes the receiver transmitter interface 300 to enable communication between the field device BLE bridge 104 and the field device MCU 318. The receiver transmitter interface 300 of the illustrated example is a UART. For example, the receiver transmitter interface 300 may transmit information to and/or receive information from the field device MCU 318 using an industrial communication protocol (e.g., a HART communication protocol, a PROFIBUS communication protocol, a WiHART communication protocol, etc.). Alternatively, the example receiver transmitter interface 300 may be an inter-integrated circuit (I2C) bus, a serial peripheral interface (SPI) bus, or other similar interface between integrated circuits (e.g., microcontrollers, processors, etc.).

In the illustrated example of FIG. 3, the field device BLE bridge 104 includes the platform manager 302 to analyze and generate commands, convert data packets based on identified protocols, and/or authenticate and/or encrypt payloads of the data packets. In the illustrated example, the platform manager 302 includes the command processor 310 to determine and direct a communication operation based on a direction of data flow. In some examples, the command processor 310 identifies one or more supported protocols of the field device 102. For example, the command processor 310 may determine that the field device 102 supports HART communication protocol and PROFIBUS communication protocol. In such an example, the command processor 310 may obtain the supported protocols by querying the field device MCU 318, by querying the database 306, etc. For example, the command processor 310 may obtain the supported protocols in response to querying the field device MCU 318. In such an example, the command processor 310 may store information or a value corresponding to the the identified supported protocols in the database 306 for future retrieval by the command processor 310. In another example, the command processor 310 may determine the supported protocols based on querying a hard-coded parameter stored in the database 306 corresponding to the supported protocols of the field device 102.

In some examples, the command processor 310 determines a direction of data flow based on a master and slave communication model. For example, the command processor 310 may determine that a data packet corresponds to a transmit request from the receiver transmitter interface 300 (e.g., a slave transmitting a notification to a master). In such an example, the command processor 310 may direct the data packet to be processed and transmitted from the receiver transmitter interface 300 to the BLE stack handler 304. In another example, the command processor 310 may determine that a data packet corresponds to a receive request from the BLE interface 308 (e.g., a master transmitting a data packet to a slave without requiring a response from the slave). In such an example, the command processor 310 may direct the data packet to be processed and transmitted from the BLE interface 308 to the receiver transmitter interface 300.

In some examples, the command processor 310 evaluates read and write BLE requests based on security information (e.g., security permissions, security rules, etc.). For example, the command processor 310 may determine that a receive request is authorized based on comparing an instruction or opcode of the receive request to a list of authorized opcodes. In such an example, the command processor 310 may reject the receive request when the command processor 310 determines that the opcode is not authorized. For example, an unauthorized opcode may indicate that a user transmitting information to the field device 102 via the field device BLE bridge 104 is not permitted to access information, change information, etc., in the field device 102.

In some examples, the command processor 310 executes communication operations of the field device BLE bridge 104 based on determining whether a value of an opcode corresponds to a specific industrial communication protocol. For example, the command processor 310 may determine that a value of an opcode corresponding to a receive request at the BLE interface 308 corresponds to HART protocol. The example command processor 310 may determine that the field device 102 supports HART protocol. In such an example, the command processor 310 may direct the BLE interface 308 to receive the information from the remote device 106 based on the comparison of the protocol indicated by the opcode value to the supported protocol of the field device 102. In some examples, the command processor 310 rejects the receive request based on a mismatch of the protocol indicated by the opcode value and the supported protocol(s) of the field device 102. In some examples, the command processor 310 directs a processing of a data packet received from the field device MCU 318 and/or the remote device 106 by calling the protocol handler 312 to perform one or more operations.

In some examples, the command processor 310 processes a radio specific command. For example, the command processor 310 may direct the BLE stack handler 304 to adjust or change the transmit power levels of the BLE interface 308. For example, the command processor 310 may direct the BLE stack handler 304 to reduce the transmit power level of the BLE interface 308 to conserve power. In another example, the command processor 310 may direct the BLE stack handler 304 to increase the transmit power level of the BLE interface 308 to increase a transmission range of the BLE interface 308. In some examples, the command processor 310 processes a radio specific command by executing a filter (e.g., a notch-filter) when the command processor 310 detects a problem with existing radio frequencies of the BLE interface 308. In some examples, the command processor 310 processes a radio specific command by turning off the BLE interface 308 to provide a full-radio-silence mode.

In the illustrated example of FIG. 3, the platform manager 302 includes the protocol handler 312 to execute communication operations based on a direction of data flow between the field device MCU 318 and the remote device 106. In some examples, the protocol handler 312 executes communication operations based on data flow from the field device MCU 318 to the field device BLE bridge 104. In such examples, the protocol handler 312 determines whether a data packet for transmission is a first data packet for a communication session. For example, in response to determining that the data packet is the first data packet of the communication session, the protocol handler 312 may read and store a protocol address (e.g., a HART protocol address, a PROFIBUS address, etc.) of the field device MCU 318. In response to determining that the data packet is not the first data packet of the communication session, the example protocol handler 312 may remove a protocol address from the data packet.

In some examples, the protocol handler 312 includes the protocol address in the data packet to be transmitted to the remote device 106 for industrial communication protocol data packet reconstruction. For example, the first data packet to be transmitted to the remote device 106 may include the protocol address, which the remote device 106 may use for future communication operations. Alternatively, the remote device 106 may transmit a read request to the field device 102 including an opcode that returns the protocol-specific address. Alternatively, the example protocol handler 312 may define an opcode that returns HART messages with addresses and an opcode that returns HART messages without addresses. For example, the remote device 106 may transmit an opcode to cause the field device 102 to return a HART message with an address of the field device 102. In such an example, the protocol handler 312 may remove the protocol information such as the HART preamble, the message integrity checks, etc., and move the HART address into a data payload of the BLE packet to be transmitted to the remote device 106 for data packet reconstruction.

In some examples, the protocol handler 312 removes protocol information (e.g., header data) from a data packet prior to transmitting the data packet via the BLE interface 308. For example, the field device MCU 318 may transmit a HART 5 formatted data packet to the protocol handler 312. In such an example, the protocol handler 312 may remove HART 5 protocol information such as a HART 5 protocol preamble, a HART 5 protocol address, a HART 5 message integrity check, etc., from the HART 5 formatted data packet. In response to removing the protocol information from the data packet, the protocol handler 312 can concatenate payload data, where the concatenated payload data can replace the removed protocol information. For example, instead of transmitting a first header and a first payload data, a second header and a second payload data, etc., the protocol handler 312 can generate a concatenated data packet including the first header, the first payload data, and the second payload data without including the second header. In such examples, additional payload data can advantageously be included in the data packet to increase an amount of data (e.g., process data) transmitted in the data packet.

The security manager 314 of the illustrated example operates to provide additional security for transmission of the data packet (e.g., to the remote device 106). For example, the security manager 314 can authenticate or encrypt the data payload included in the data packet. In some examples, the command processor 310 identifies whether the payload of the data packet is to be transmitted via the BLE interface 308 as plaintext, authenticated plaintext, and/or authenticated and encrypted plaintext. In some examples, the command processor 310 may determine that the data packet is to be broadcast via the BLE interface 308 as plaintext because the information included in the data payload is not proprietary and/or can be viewed by any of the example remote devices 200-204. In some such examples, the command processor 310 can determine that a data packet is not to be protected during transmission. For example, the command processor 310 may determine that the division or portion of the process control system with which the field device 102 is associated does not require data packets to be authenticated and/or encrypted. In some such examples, the owner of the field device 102 (e.g., a client) is not concerned with other entities accessing or viewing the data included in the data packet. In some alternative examples, the command processor 310 determines that the data packet is to be authenticated for transmission to protect the integrity of the data payload within the data packet. Further, in some examples, the command processor 310 determines that the data packet is to be encrypted for transmission via the BLE interface 308. For example, the command processor 310 can determine that the data payload is intended for a specific client within a refinery where multiple clients operate (e.g., each client having their own field devices operating throughout the refinery). In such an example, the data payload within the data packet is encrypted to ensure the data packet is delivered to and is accessible by the correct recipient and other entities (e.g., clients) within the refinery cannot access the data included in the data packet.

In some examples, the command processor 310 determines that the data packet is to be encrypted prior to transmission (e.g., via broadcast transmission). In such examples, the security manager 314 generates a nonce value and uses the nonce value as an input to an encryption algorithm (e.g., an AES-256 encryption algorithm). The nonce value is generated by the security manager 314 of the illustrated example based on a source bit, a direction bit, a counter, and/or an initialization vector. For example, the security manager 314 determines a value (e.g., 0 or 1) for the source bit, which indicates the method of transmission of the data packet. For example, the security manager 314 determines whether the data packet is to be broadcast (e.g., over the BLE network 322) or is to be transmitted via a direct connection between the field device 102 and the remote device 106 (e.g., Wi-Fi Direct). In some examples, a direct connection may refer to a wireless data transfer between a first device (e.g., the field device 102) and a second device (e.g., the remote device 106) without transferring to any intermediary devices between the first device and the second device (e.g., Bluetooth, Wi-Fi Direct, etc.). Alternatively, in some examples, a direct connection may refer to a direct wired connection (e.g., an ethernet cable) between a first device and a second device. The security manager 314 further determines the direction bit, which indicates a direction of transmission of the data packet as either from field device 102 to the remote device 106 or from the remote device 106 to the field device 102. In the illustrated example, the security manager 314 determines the counter (e.g., a counter incremented after each transmission of a data packet) and/or the initialization vector (e.g., determined using a random number generator) for the nonce value.

In some examples, the security manager 314 further uses an encryption key and inputs the encryption key into the encryption algorithm in combination with the nonce value. In some examples, the security manager 314 may access an encryption key database. In some such examples, the encryption key database includes pre-shared encryption keys. For example, the encryption keys may be shared with the field device 102 and the remote device 106 that is the intended recipient of the data packet. In some examples, the encryption algorithm used by the security manager 314 converts the plaintext data of the payload to ciphertext (e.g., encrypted text). The encryption algorithm used by the security manager 314 and generation of the ciphertext are discussed further in connection with FIG. 8A.

When the command processor 310 determines that the payload data is to be authenticated, the security manager 314 of the illustrated example generates a message authentication code (MAC). In some examples, the security manager 314 generates the MAC to authenticate the payload and/or associated data, as discussed in further detail in connection with FIGS. 6-8B. In some examples, the MAC is appended to the payload prior to transmission. In some examples, the MAC can be appended to the payload before the payload is encrypted. Generation of the MAC using a cipher block chaining message authentication code (CBC-MAC) method is discussed further in connection with FIG. 8B. In some examples, the security manager 314 may generate the MAC based on a universal hashing algorithm, such as universal hashing MAC (UMAC), VMAC, etc. In some alternative examples, the security manager 314 may generate the MAC based on a block cipher algorithm, such as, for example, one-key MAC (OMAC), parallelizable MAC (PMAC), etc. The MAC ensures that manipulation, deletion, and/or any other interference with the data included in the header data and/or the payload is detected when the data packet is received at another device (e.g., at the remote device 106). The security manager 414 of the illustrated example further generates a message integrity check (MIC) by encrypting the MAC, as discussed further in connection with FIGS. 6-8B.

In the illustrated example, the security manager 314 further determines a value for an authentication bit and an encryption bit. For example, the command processor 310 determines whether the payload is to be authenticated prior to transmission, and the security manager 314 determines the authentication bit to have a value of 0 or 1 based on the determination of the command processor 310. Further, in the illustrated example, the security manager 314 determines a value for an encryption bit. For example, the command processor 310 determines whether the payload is to be encrypted, and the security manager 314 determines that the authentication bit is to have a value of 0 or 1. The example authentication bit and encryption bit are thus used by the remote device BLE bridge 110 to determine whether the payload is to be authenticated and/or decrypted upon receipt of the data packet.

In some examples, flags included in associated data of the data packet include the direction bit and the source bit used in the generation of the nonce value. In some examples, the flags further include the authentication bit and the encryption bit, as well as a version least significant bit, a version most significant bit, and/or other bits reserved for additional information or future use. Further, in some examples, the flags include an auxiliary bit that indicates whether the data packet includes auxiliary information that can be used by the remote device 106 during authentication and/or decryption of the payload of the data packet. For example, when the data packet includes the auxiliary information the auxiliary bit may have a value of 1, while the auxiliary bit may have a value of 0 to indicate that the data packet does not include auxiliary information. The auxiliary information can include information used to generate the nonce value, such as an initialization vector. Further, the auxiliary information can include an encryption key identifier used in connection with the encryption algorithm (e.g., the CCM encryption method of FIG. 8A) and/or the MAC generation method (e.g., the CBC-MAC method of FIG. 8B). In some examples, the auxiliary data is interlaced with data packets including a payload from the field device MCU 318. For example, the field device BLE bridge 104 may transmit auxiliary information every ten data packets that are sent to the remote device 106.

In some alternative examples, when the data packet is transmitted via the direct connection, the data packet is generally authenticated and encrypted. In some examples, the data packets transmitted via direct connection do not include auxiliary data (e.g., interlaced auxiliary data) because the field device 102 and the remote device 106 shared the auxiliary information (e.g., an initialization vector, encryption key, etc.) during a handshake between the field device 102 and the remote device 106. For example, when the field device 102 and the remote device 106 first establish a direct connection, an initialization vector and an encryption key are determined and, further, used in subsequent communications.

In some examples, when the command processor 310 determines that the payload is to be transmitted as plaintext (e.g., the security manager 314 does not authenticate or encrypt the payload prior to transmission), the payload is directed to the security manager 314 for generation of associated data. For example, the security manager 314 generates flags for the data packet by determining values for a source bit, a direction bit, an authentication bit, and/or an encryption bit. Additionally or alternatively, the security manager 314 may determine values for a version least significant bit, a version most significant bit to be added to the header, and an auxiliary bit. When the data packet is transmitted as plaintext data, the security manager 314 determines the authentication bit and the encryption bit to have values of 0 (e.g., the data packet is not to be authenticated or encrypted when it is transmitted as plaintext). In some examples, when the security manager 314 is to transmit auxiliary information in the data packet (e.g., every tenth data packet transmission includes auxiliary information), the auxiliary information is in plaintext form and is transmitted as a plaintext payload.

Further, the security manager 314 can decrypt an encrypted payload of a data packet received at the field device 102 (e.g., received from the remote device 106). For example, when a data packet is received at the field device 102 (e.g., via a direct connection), the data packet may be directed to the security manager 314 to authenticate and decrypt the payload prior to being transmitted to the field device MCU 318. When the security manager 314 receives the data packet including the encrypted payload, the security manager 314 can access plaintext data included in associated data included in the data packet. For example, the associated data includes the direction bit, the source bit, and the counter the that can be used to decrypt the encrypted payload. The security manager 314 further accesses auxiliary data, including an encryption key identifier that indicates to the security manager 314 which encryption key is to be used to decrypt the payload and an initialization vector. In some examples, the security manager 314 has access to a number of pre-shared keys (e.g., keys known to the security manager 314). In some such examples, the pre-shared keys are included in an application located outside of the field device 102 that can be accessed by the security manager 314. The auxiliary data and the associated data can be used to determine a nonce value that was used during encryption of the payload by the remote device 106 prior to transmission of the data packet to the field device 102. Generation of the nonce value is discussed further in connection with FIG. 7. When the security manager 314 has determined the nonce value, the nonce value is used in combination with the encryption key identifier to decrypt the payload. In some examples, the security manager 314 authenticates the integrity of the payload and/or the header data (e.g., using the MAC) after decrypting the payload. In some such examples, the security manager 314 may discard a data packet if the payload and/or associated data are determined to not be authentic (e.g., the payload and/or the associated data have been manipulated). In some examples, the payload is authenticated and not encrypted. In such examples, the security manager 314 authenticates the payload and/or the associated data (e.g., using the MAC) and directs the authenticated payload and/or associated data to the example protocol handler 312.

In some examples, the security manager 314 directs the data packet, including associated data and the payload (e.g., as plaintext), to the protocol handler 312 for further processing. For example, when the security manager 314 has authenticated the data packet and/or decrypted the payload, the security manager 314 may transmit the data packet to the protocol handler 312 as plaintext. In some examples, such as for example when the data packet is transmitted via a direct connection, the protocol handler 312 adds protocol information to the data packet (e.g., a protocol preamble, a protocol address, and a protocol message integrity check) based on a supported protocol of the field device 102. For example, the BLE interface 308 may receive a data packet from the remote device 106 including an identifier corresponding to HART 7 protocol. In such an example, the protocol handler 312 may add HART 7 protocol information such as a HART 7 protocol preamble, a HART 7 protocol address, a HART 7 message integrity check, etc., to the received data packet. In response to adding the protocol information to the received data packet, the example protocol handler 312 may direct the receiver transmitter interface 300 to transmit the processed data packet (e.g., the received data packet with the added protocol information) to the example field device MCU 318.

In some examples, the protocol handler 312 determines whether the data packet is properly formed based on evaluating an industrial protocol command. For example, the protocol handler 312 may receive a data packet including an industrial protocol command. In such an example, the protocol handler 312 may determine that the industrial protocol command is valid (e.g., HART command 0 is valid) or not valid (e.g., HART command 255 is not valid). The example protocol handler 312 may accept the data packet based on verifying that the industrial protocol command is valid or reject the data packet based on not verifying that the industrial protocol command is valid.

In some examples, the protocol handler 312 determines whether the data packet is properly formed based on evaluating a data length (e.g., a number of bytes) corresponding to an industrial protocol command. For example, the protocol handler 312 may receive a data packet including an industrial protocol command with a corresponding data length of 8 bytes. In such an example, the protocol handler 312 may determine that the industrial protocol command is defined by a maximum of 6 bytes to be properly formed. The example protocol handler 312 may compare the received data length of 8 bytes to the defined properly formed length of 6 bytes and determine that the data packet is not properly formed based on the comparison. In such an example, the protocol handler 312 may reject the data packet and/or transmit an error code to a transmitter of the data packet based on determining that the data packet is not properly formed.

In some examples, the protocol handler 312 determines whether the data packet is properly formed based on evaluating a range of a parameter value. For example, the protocol handler 312 may receive a data packet including a value for a valve position setpoint parameter of 2000%. In such an example, the protocol handler 312 may determine that the valve position setpoint parameter is defined by a range of 0-100% to be properly formed. The example protocol handler 312 may compare the received setpoint of 2000% to the defined properly formed range of 0-100% and determine that the data packet is not properly formed based on the comparison. In such an example, the protocol handler 312 may reject the data packet and/or transmit an error code to a transmitter of the data packet based on determining that the data packet is not properly formed.

In the illustrated example of FIG. 3, the RX/TX interface handler 316 is to process communication operations between the field device MCU 318 and the BLE interface 308. In some examples, the RX/TX interface handler 316 receives a data packet from the receiver transmitter interface 300 and transmits the data packet to the BLE interface 308 via the BLE stack handler 304. For example, the RX/TX interface handler 316 includes a TX buffer to obtain a data packet designated to be transmitted to the BLE interface 308 from the field device MCU 318. In some examples, the RX/TX interface handler 316 receives a data packet from the BLE interface 308 and transmits the data packet to the field device MCU 318. For example, the RX/TX interface handler 316 may obtain a data packet designated to be transmitted to the field device MCU 318 from the BLE interface 308. The BLE interface 308 and the field device MCU 318 of the illustrated example support UART, I2C, SPI, and/or other similar integrated circuit communication protocol.

In the illustrated example, the Field device BLE bridge 104 includes the BLE stack handler 304 to manage the BLE interface 308. In some examples, the BLE stack handler 304 emulates a serial port connection over a Bluetooth wireless connection. For example, the BLE stack handler 304 may emulate a UART to facilitate communication between the BLE interface 308 and the platform manager 302.

In the illustrated example, the field device BLE bridge 104 includes the database 306 to record data (e.g., the mode of the field device 102, the protocol address, a parameter of the BLE stack handler 304, a parameter of the BLE interface 308, etc.). The example database 306 may respond to queries for information related to data in the database 306. For example, the database 306 may respond to queries for additional data by providing the additional data (e.g., the one or more data points), by providing an index associated with the additional data in the database 306, etc. The example database 306 may additionally or alternatively respond to queries when there is no additional data in the database 306 by providing a null index, an end of database identifier, etc.

The example database 306 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example database 306 may additionally or alternatively be implemented by one or more double data rate (DDR) memories, such as DDR, DDR2, DDR3, DDR4, mobile DDR (mDDR), etc. The example database 306 may additionally or alternatively be implemented by one or more mass storage devices such as hard disk drive(s), compact disk drive(s) digital versatile disk drive(s), solid-state drive(s), etc. While in the illustrated example the database 306 is illustrated as a single database, the database 306 may be implemented by any number and/or type(s) of databases.

In the illustrated example, the field device BLE bridge 104 includes the BLE interface 308 to transmit information to and/or receive information from an external device such as the remote device 106. The BLE interface 308 of the illustrated example is a radio transceiver operating in the 2.4 GHz unlicensed ISM band. For example, the BLE interface 308 may operate the radio transceiver based on a connection interval, a radio power level, a latency, etc., implemented by the BLE stack handler 304.

While an example manner of implementing the Field device BLE bridge 104 of FIGS. 1-2 is illustrated in FIG. 3, one or more of the elements, processes and/or devices illustrated in FIG. 3 may be combined, divided, re-arranged, omitted, eliminated and/or implemented in any other way. Further, the example receiver transmitter interface 300, the example platform manager 302, the example command processor 310, the example protocol handler 312, the example security manager 314, the example RX/TX interface handler 316, the example BLE stack handler 304, the example database 306, the example BLE interface 308, and/or, more generally, the example field device BLE bridge 104 of FIG. 3 may be implemented by hardware, software, firmware and/or any combination of hardware, software and/or firmware. Thus, for example, any of the example receiver transmitter interface 300, the example platform manager 302, the example command processor 310, the example protocol handler 312, the example security manager 314, the example RX/TX interface handler 316, the example BLE stack handler 304, the example database 306, the example BLE interface 308, and/or, more generally, the example field device BLE bridge 104 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example receiver transmitter interface 300, the example platform manager 302, the example command processor 310, the example protocol handler 312, the example security manager 314, the example RX/TX interface handler 316, the example BLE stack handler 304, the example database 306, and/or the example BLE interface 308 is/are hereby expressly defined to include a non-transitory computer readable storage device or storage disk such as a memory, a digital versatile disk (DVD), a compact disk (CD), a Blu-ray disk, etc. including the software and/or firmware. Further still, the example field device BLE bridge 104 of FIG. 3 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
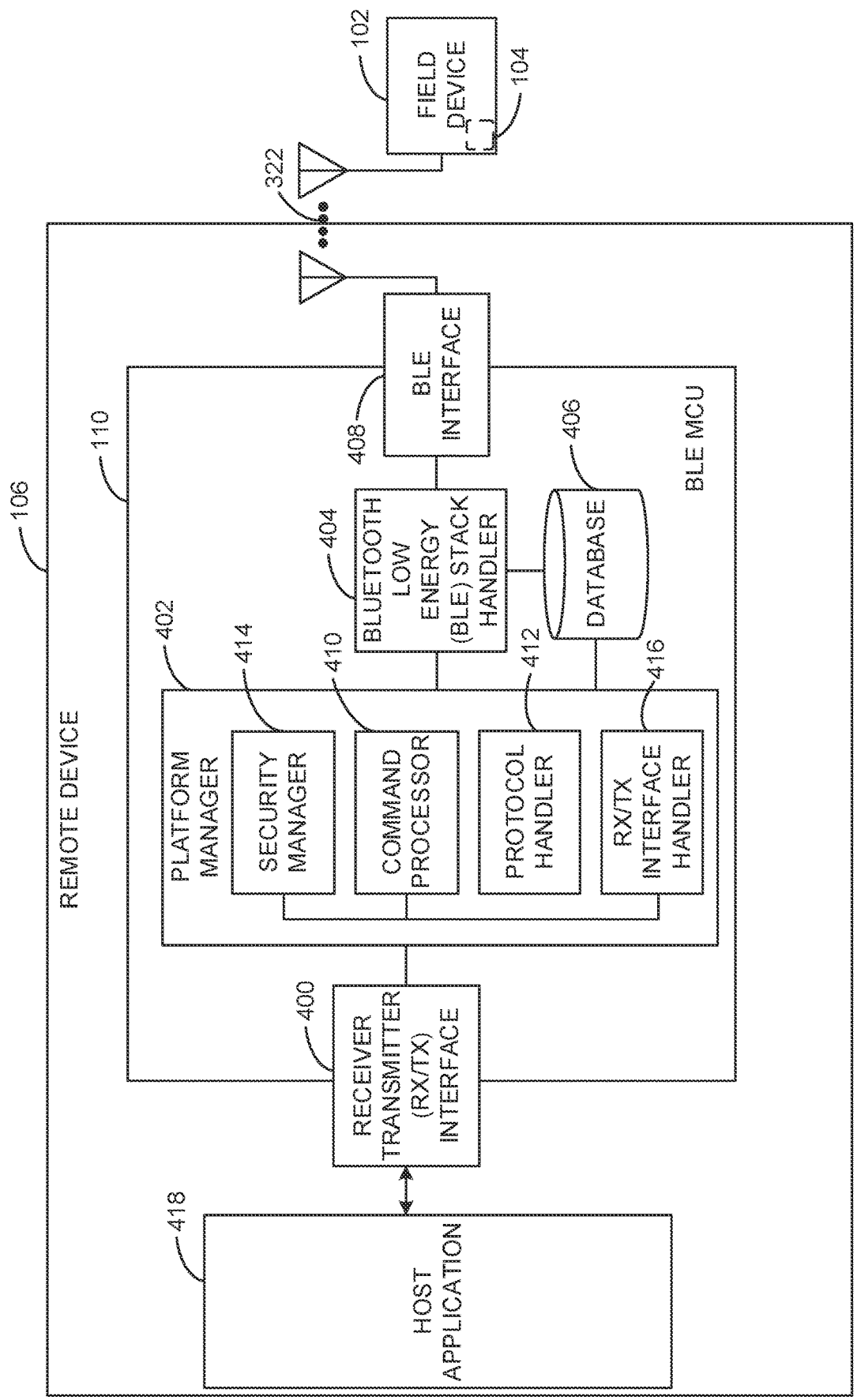
FIG. 4 is a block diagram of an example implementation of a remote device BLE bridge apparatus included in the remote device of FIGS. 1 and/or 3.

FIG. 4 is a block diagram of an example implementation of the remote device BLE bridge 110 included in the remote device 106 of FIGS. 1 and/or 3. In the illustrated example, the remote device BLE bridge 110 includes an example receiver transmitter (RX/TX) interface 400, an example platform manager 402, an example Bluetooth low energy (BLE) stack handler 404, an example database 406, and an example BLE interface 408. The platform manager 402 of the illustrated example includes an example command processor 410, an example protocol handler 412, and an example security manager 414, and an RX/TX interface handler 416. Further shown are an example host application 418, the example BLE network 322 of FIG. 3, and the example field device 102 of FIGS. 1-3. In the illustrated example of FIG. 4, the remote device 106 allows user control of BLE radio firmware used to transmit and/or receive data over the BLE network 322, such as, for example, an Emerson AMS Trex, an Emerson remote sensor, etc. Alternatively, the remote device 106 may be an Android or iOS device that does not allow user control of the BLE radio firmware. In such examples, the platform manager 402, including the command processor 410, the protocol handler 412, the security manager 414, and the RX/TX interface handler 416, is included in the host application 418 to perform the operations discussed in detail below.

The remote device BLE bridge 110 of the illustrated example is included within the example remote device 106 of FIGS. 1 and/or 3. Additionally or alternatively, the remote device BLE bridge 110 of FIG. 4 may be included in any device in communication with the example field device 102 of FIGS. 1-3, such as the example Remote Device 1 200, Remote Device 2 202, and Remote Device 3 204 of FIG. 2. In the illustrated example, the remote device 106 is communicatively coupled to the field device 102 via the example BLE network 322. In some examples, the remote device 106 and the field device 102 are connected via a hard wired connection. Additionally or alternatively, the field device 102 may broadcast data packets (e.g., a one-way transmission of data) that are received by the remote device 106 (e.g., by the BLE interface 408).

In the illustrated example of FIG. 4, the remote device BLE bridge 110 includes the platform manager 402 to analyze and generate commands, authenticate and/or decrypt payloads of data packets, and/or convert data packets based on identified protocols. In the illustrated example, the platform manager 402 includes the command processor 410 to determine and direct a communication operation based on a direction of data flow. In some examples, the command processor 410 identifies one or more supported protocols of the remote device 106. For example, the command processor 410 may determine that the remote device 106 supports HART communication protocol and PROFIBUS communication protocol. In such an example, the command processor 410 may obtain the supported protocols by querying the host application 418, by querying the database 406, etc. For example, the command processor 410 may obtain the supported protocols in response to querying the host application 418. In such an example, the command processor 410 may store information or a value corresponding to the identified supported protocols in the database 406 for future retrieval by the command processor 410. In another example, the command processor 410 may determine the supported protocols based on querying a hard-coded parameter stored in the database 406 corresponding to the supported protocols of the remote device 106.

As discussed in connection with FIG. 3, the field device 102 can, in some examples, transmit a data packet over the BLE network 322. In some such examples, the data packet is formatted according to a BLE protocol (e.g., after the example protocol handler 312 of FIG. 3 removes a HART 7 protocol) and transmitted to the remote device 106. The example BLE interface 408 of the remote device BLE bridge 110 receives transmissions from the field device 102 and conveys the transmissions to the example RX/TX interface handler 416 via the example BLE stack handler 404. The RX/TX interface handler 416 processes communication operations between the BLE interface 408 and the example host application 418. In some examples, the RX/TX interface handler 416 receives a data packet from the BLE interface 408 and transmits the data packet to the receiver transmitter interface 400 via the BLE stack handler 304. For example, the RX/TX interface handler 416 includes a receiver (RX) to obtain a data packet designated to be transmitted to the host application 418 from the BLE interface 408. In some examples, the RX/TX interface handler 416 receives a data packet from the receiver transmitter interface 400 and transmits the data packet to the BLE interface 408 via the BLE stack handler 404. For example, the RX/TX interface handler 416 includes a transmitter (TX) buffer to obtain a data packet designated to be transmitted to the BLE interface 408 from the host application 418. The BLE interface 408 and the host application 418 of the illustrated example support UART, I2C, SPI, and/or other similar integrated circuit communication protocols.

In some examples, the command processor 410 determines a direction of data flow based on a master and slave communication model. For example, the command processor 410 may determine that a data packet corresponds to a transmit request from the receiver transmitter interface 400 (e.g., a slave transmitting a notification to a master). In such an example, the command processor 410 may direct the data packet to be processed and transmitted from the receiver transmitter interface 400 to the BLE stack handler 404. In another example, the command processor 410 may determine that a data packet corresponds to a receive request from the BLE interface 408 (e.g., a master transmitting a data packet to a slave without requiring a response from the slave). In such an example, the command processor 410 may direct the data packet to be processed and transmitted from the BLE interface 408 to the receiver transmitter interface 400.

In some examples, the command processor 410 evaluates read and write BLE requests based on security information (e.g., security permissions, security rules, etc.). For example, the command processor 410 may determine that a receive request is authorized based on comparing an opcode of the receive request to a list of authorized opcodes. In such an example, the command processor 410 may reject the receive request when the command processor 410 determines that the opcode is not authorized. For example, an unauthorized opcode may indicate that a user transmitting information to the remote device 106 via the remote device BLE bridge 110 is not permitted to access information, change information, etc., on the remote device 106.

In some examples, the command processor 410 executes communication operations of the remote device BLE bridge 110 based on determining whether a value of an opcode corresponds to a specific industrial communication protocol. For example, the command processor 410 may determine that a value of an opcode corresponding to a receive request at the BLE interface 408 corresponds to HART protocol. The example command processor 410 may determine that the host application 418 of the remote device 106 supports HART protocol. In such an example, the command processor 410 may direct the BLE interface 408 to receive the information from the field device 102 based on the comparison of the protocol indicated by the opcode value to the supported protocol of the host application 418. In some examples, the command processor 410 rejects the receive request based on a mismatch of the protocol indicated by the opcode value and the supported protocol(s) of the host application 418. In some examples, the command processor 410 directs a processing of a data packet received from the field device BLE bridge 104 by calling on the protocol handler 412 to perform one or more operations.

In some examples, the command processor 410 processes a radio specific command. For example, the command processor 410 may direct the BLE stack handler 404 to adjust or change the transmit power levels of the BLE interface 408. For example, the command processor 410 may direct the BLE stack handler 404 to reduce the transmit power level of the BLE interface 408 to conserve power. In another example, the command processor 410 may direct the BLE stack handler 404 to increase the transmit power level of the BLE interface 408 to increase a transmission range of the BLE interface 408. In some examples, the command processor 410 processes a radio specific command by executing a filter (e.g., a notch-filter) when the command processor 410 detects a problem with existing radio frequencies of the BLE interface 408. In some examples, the command processor 410 processes a radio specific command by turning off the BLE interface 408 completely to go into a full-radio-silence mode.

In the illustrated example of FIG. 4, the platform manager 402 includes the protocol handler 412 to execute communication operations based on a direction of data flow between the field device 102 and the remote device 106. In some examples, the protocol handler 412 executes communication operations based on data flow from the host application 418 to the remote device BLE bridge 110. In such examples, the protocol handler 412 determines whether a data packet that is received from the field device 102 is a first data packet for a communication session. For example, in response to determining that the data packet is the first data packet of the communication session, the protocol handler 412 may read and store a protocol address (e.g., a HART protocol address, a PROFIBUS address, etc.) used by the field device MCU 318 of FIG. 3 that is included in the field device 102. In some such examples, the protocol address read and stored by the protocol handler 412 may be used for data packet reconstruction. In response to determining that the data packet is not the first data packet of the communication session, the example protocol handler 412 may remove a protocol address from the data packet.

In some examples, the protocol handler 412 removes protocol information from a data packet prior to transmitting the data packet to the security manager 414 and, further, to the host application 418. For example, as discussed in connection with FIG. 3, the field device BLE bridge 104 of FIGS. 1-4 may transmit a data packet to the remote device 106 via the BLE network 322 according to a BLE protocol. In such an example, the BLE protocol data packet is transferred to the protocol handler 412 via the BLE interface 408 and the BLE stack handler 404. In some examples, the protocol handler 412 removes BLE protocol information from the data packet, such as a BLE protocol preamble, a BLE protocol address, a BLE message integrity check, etc., from the BLE protocol data packet. In some examples, when the protocol handler 412 has removed the BLE protocol information, the data packet is transmitted to the security manager 414.

When the security manager 414 of the illustrated example receives the packet from the protocol handler 412, the security manager 414 may authenticate and/or decrypt a payload included in the data packet to obtain process data (e.g., process data associated with the field device 102) and/or other data from the data packet (e.g., associated data). In some examples, associated data included in the data packet includes an encryption bit and an authentication bit that indicate to the security manager 414 whether the payload of the data packet is encrypted and/or authenticated (e.g., with a CBC-MAC), respectively. For example, the encryption bit may have a value of 0 to indicate that the payload is not encrypted or a value of 1 to indicate that the payload is encrypted. Additionally or alternatively, the authentication bit may have a value of 0 to indicate that the payload has not been authenticated at the field device BLE bridge of FIGS. 1-4 (e.g., with a MAC) or a value of 1 to indicate that the payload has been authenticated.

In some examples, the payload of the data packet may be encrypted prior to transmission of the data packet (e.g., from the field device 102). In such an example, the security manager 414 is to decrypt the payload to access the payload. In some examples, the security manager 414 may use an encryption key to decrypt the payload of the data packet. For example, the security manager 414 may have received auxiliary information that includes an encryption key identifier that identifies the encryption key to be used by the security manager 414 to decrypt the payload. In some examples, the encryption key is a pre-shared key that is stored internally (e.g., in the database 406) or externally (e.g., in the cloud via the LastPass® app, a hardware authenticated device supporting encryption keys, etc.) and is accessible by the security manager 414. For example, the security manager 414 may identify the pre-shared encryption key that is to be used to decrypt the payload from the encryption key identifier stored in the header data and access the pre-shared encryption key from an external database.

Further, in some examples, the encryption key is used in combination with a nonce value generated by the security manager 414. For example, the encryption key and the nonce value may be used as inputs to an encryption algorithm (e.g., an AES-256 encryption algorithm, as discussed in connection with FIG. 8A) to decrypt the payload. In such examples, the security manager 414 is able to decrypt the ciphertext (e.g., the encrypted payload) because the associated data and the auxiliary data allow the security manager 414 to generate the nonce value used as an input (e.g., an adder) in the encryption process (e.g., by the security manager 314 of FIG. 3) and to access the encryption key used in the encryption process (e.g., based on the encryption key identifier). Thus, in the illustrated example, the security manager 414 decrypts the encrypted payload by reversing the encryption process used by the security manager 314 of FIG. 3 and applying the same nonce value and encryption key to the reversed encryption algorithm. In some examples, when the security manager 414 has decrypted the payload, the security manager 414 can further access the process data (e.g., alerts, alarms, process values, etc.) and/or other data included in the payload. Additionally or alternatively, after decrypting the payload, the decrypted payload may be directed to the protocol handler 412 and/or the host application 418 where the process data and/or other data is accessed.

In some examples, the security manager 414 generates the nonce value based on data included in the associated data of the data packet and the auxiliary data (e.g. included in a previously received data packet). For example, the associated data may include data bits that were used by the security manager 314 of FIG. 3 to generate the nonce value prior to transmission of the data packet from the field device 102 to the remote device 106, such as a direction bit and a source bit. The security manager 414 can further use a counter included in the associated data and an initialization vector included in the auxiliary data for generation of the nonce value. Generation of the nonce value by the example security manager 414 is discussed further in connection with FIG. 7. When the security manager 414 has the nonce value and an encryption key, the security manager 414 can decrypt and authenticate the payload included in the data packet.

In some examples, the example security manager 414 protects the host application 418 from intentionally malformed data or partially malformed data (e.g., fuzzing) by determining whether the data packet is properly formed. For example, when the data packet is received from the field device 102, the security manager 414 can determine whether a message authentication code (MAC) is included in the data packet (e.g., when the data packet includes a payload of authenticated plaintext). The security manager 414 generates a MAC and determines, based on the MAC appended to the received payload, whether the payload data and/or the associated data of the data packet have been modified. When the MAC generated by the security manager 414 does not match the received MAC (e.g., the MAC appended to the payload), the security manager determines that the data packet has been malformed or manipulated, and the security manager 414 can discard the data packet to reduce the risk associated with transmitting the malformed or manipulated data packet to the host application 418. When the MAC generated by the security manager 414 does match the received MAC, the security manager 414 determines that the data packet is authentic and is then further processed by the remote device BLE bridge 110. In some examples, the MAC has been encrypted (e.g., by the security manager 314 of FIG. 3) to generate a message integrity check (MIC) prior to receipt of the data packet by the remote device BLE bridge 110. In such examples, the security manager 414 decrypts the MIC to create the MAC. For example, the security manager 414 may generate the MAC from the MIC using the CCM encryption method of FIG. 8A.

Figure 8A:
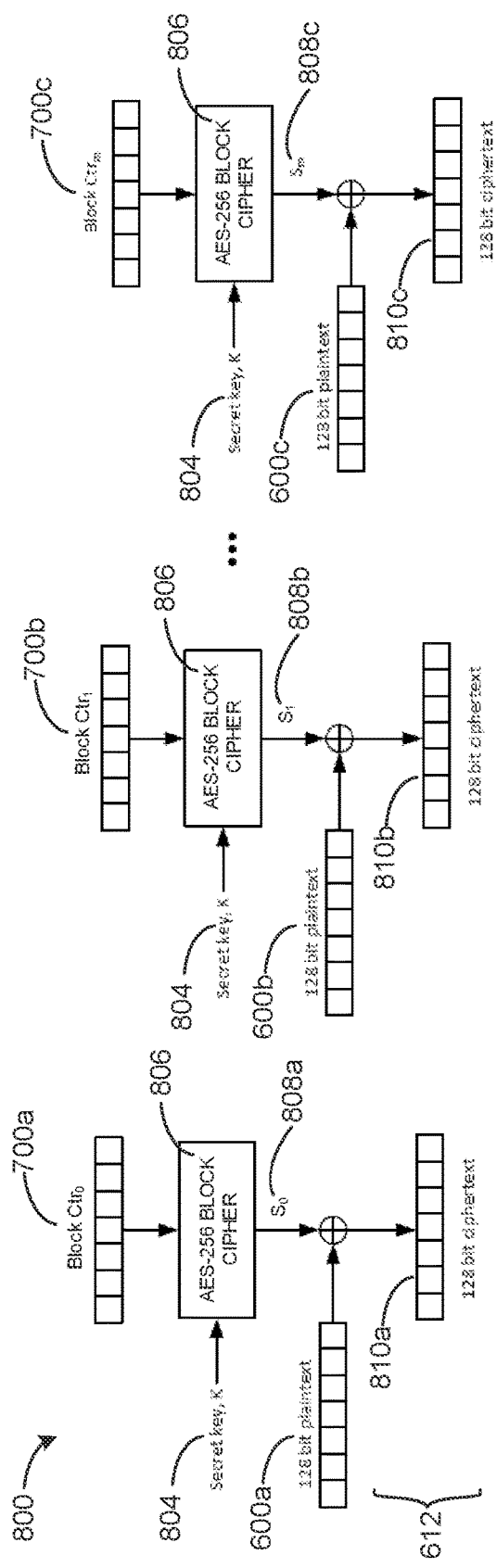
FIG. 8A is an illustrated example of a counter mode encryption method.
Figure 8B:
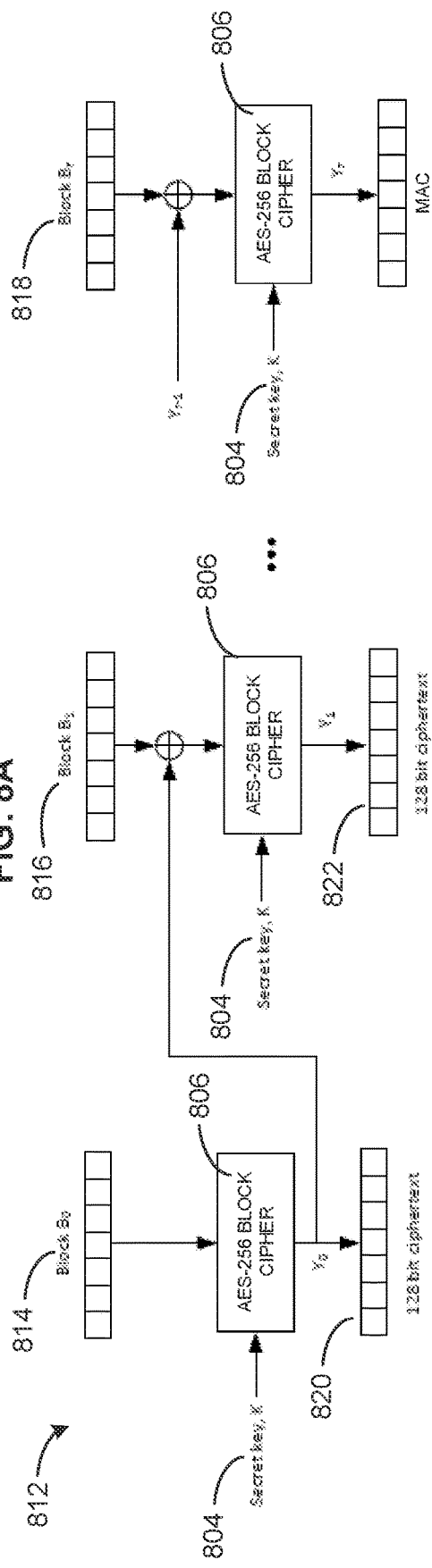
FIG. 8B is an illustrated example of a cipher block chaining-message authentication code (CBC-MAC) method for generating a message authentication code.

In some examples, the security manager 414 generates the MAC using a cipher block chaining message authentication code (CBC-MAC) method, as discussed further in connection with FIG. 8B. Additionally or alternatively, the security manager 414 may generate the MAC based on a universal hashing algorithm, such as universal hashing MAC (UMAC), VMAC, etc. In some examples, the security manager 414 may generate the MAC based on a block cipher algorithm, such as, for example, one-key MAC (OMAC), parallelizable MAC (PMAC), etc. The MAC ensures that manipulation, deletion, and/or any other interference with the data included in the associated data and/or the payload is detected when the data packet is received at the remote device BLE bridge 110.

In some examples, the protocol handler 412 transmits a data packet received via a direct connection from the field device 102 to the security manager 414 after removing the BLE protocol information (e.g., a BLE protocol preamble, a BLE protocol address, a BLE message integrity check, etc.). In such examples, the security manager 414 decrypts the payload and the MIC and, further, authenticates the data packet received at the BLE interface 408. In some examples, the security manager 414 does not use auxiliary data during decryption and authentication of a data packet received via direct connection. For example, the field device 102 and the remote device 106 can share auxiliary information (e.g., encryption key identifiers, an initialization vector, etc.) during a handshake between the field device 102 and the remote device 106. The security manager 414 can further use the auxiliary information and the associated data of the data packet during the decryption and authentication processes. Further, in some examples, the remote device 106 transmits a data packet to the field device 102 (e.g., via a direct connection). In such examples, the remote device 106 encrypts and authenticates the payload prior to transmission of the data packet.

In some examples, the protocol handler 412 receives the plaintext data returned from the security manager 414 and reconstructs a data packet according to an industrial protocol (e.g., HART communication protocol, PROFIBUS, MODBUS, etc.). For example, the protocol handler 312 of FIG. 3 may include the industrial protocol address (e.g., a HART protocol address, a PROFIBUS address, etc.) in the data packet (e.g., the data packet transmitted from the field device 102) that is received by the remote device BLE bridge 110. The industrial protocol address is then used by the protocol handler 412 for industrial communication protocol data packet reconstruction. In some such examples, the first data packet received by the remote device BLE bridge 110 may include the industrial protocol address that the remote device BLE bridge 110 may use for future communication operations at the host application 418. Alternatively, the remote device BLE bridge 110 may transmit a read request to the field device 102 including an opcode that returns the protocol-specific address.

In the illustrated example, the RX/TX interface handler 416 receives a data packet formatted according to the industrial protocol from the protocol handler 412 (e.g., after data packet reconstruction) and transmits the data packet to the host application 418. For example, the RX/TX interface handler 416 includes a receiver (RX) to obtain a data packet designated to be transmitted to the host application 418 from the protocol handler 412. In some examples, the protocol handler 412 determines whether the data packet is properly formed based on evaluating an industrial protocol command. For example, the protocol handler 412 may receive a data packet including an industrial protocol command. In such an example, the protocol handler 412 may determine that the industrial protocol command is valid (e.g., HART command 0 is valid) or not valid (e.g., HART command 255 is not valid). The example protocol handler 412 may accept the data packet based on verifying that the industrial protocol command is valid or reject the data packet based on not verifying that the industrial protocol command is valid.

In some examples, the RX/TX interface handler 416 processes communication operations between the host application 418 and the BLE interface 408. The BLE interface 408 and the host application 418 of the illustrated example support UART, I2C, SPI, and/or other similar integrated circuit communication protocol. In some examples, the RX/TX interface handler 416 receives a data packet from the receiver transmitter interface 400 and transmits the data packet to the BLE interface 408 via the BLE stack handler 404. For example, the RX/TX interface handler 416 includes a transmitter (TX) buffer to obtain a data packet designated to be transmitted to the BLE interface 408 from the host application 418. In some examples, the data packet is formatted by the protocol handler 412 (e.g., according to a BLE protocol), and the payload of the data packet is constructed, authenticated, and/or encrypted by the security manager 414 before the RX/TX interface handler 416 transmits the data packet to the BLE interface 408.

In the illustrated example, the remote device BLE bridge 110 includes the BLE stack handler 404 to manage the BLE interface 408. In some examples, the BLE stack handler 404 emulates a serial port connection over a Bluetooth wireless connection. For example, the BLE stack handler 404 may emulate a UART to facilitate communication between the BLE interface 408 and the platform manager 402. In the illustrated example, the remote device BLE bridge 110 includes the database 406 to record data (e.g., the mode of the remote device 106, the protocol address, a parameter of the BLE stack handler 404, a parameter of the BLE interface 408, etc.). The example database 406 may respond to queries for information related to data in the database 406. For example, the database 406 may respond to queries for additional data by providing the additional data (e.g., the one or more data points), by providing an index associated with the additional data in the database 406, by providing pre-shared encryption keys, etc. The example database 406 may additionally or alternatively respond to queries when there is no additional data in the database 406 by providing a null index, an end of database identifier, etc.

The example database 406 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example database 406 may additionally or alternatively be implemented by one or more double data rate (DDR) memories, such as DDR, DDR2, DDR4, DDR4, mobile DDR (mDDR), etc. The example database 406 may additionally or alternatively be implemented by one or more mass storage devices such as hard disk drive(s), compact disk drive(s) digital versatile disk drive(s), solid-state drive(s), etc. While in the illustrated example the database 406 is illustrated as a single database, the database 406 may be implemented by any number and/or type(s) of databases.

In the illustrated example, the remote device BLE bridge 110 includes the BLE interface 408 to transmit information to and/or receive information from an external device such as the field device 102. The BLE interface 408 of the illustrated example is a radio transceiver operating in the 2.4 GHz unlicensed ISM band. For example, the BLE interface 408 may operate the radio transceiver based on a connection interval, a radio power level, a latency, etc., implemented by the BLE stack handler 404.

While an example manner of implementing the remote device BLE bridge 110 of FIGS. 1-3 is illustrated in FIG. 4, one or more of the elements, processes and/or devices illustrated in FIG. 4 may be combined, divided, re-arranged, omitted, eliminated and/or implemented in any other way. Further, the example receiver transmitter (RX/TX) interface 400, the example platform manager 402, the example BLE stack handler 404, the example database 406, the example BLE interface 408, the example command processor 410, the example protocol handler 412, the example security manager 414, the example RX/TX interface handler 416, the example host application 418, and/or, more generally, the example remote device BLE bridge 110 of FIG. 4 may be implemented by hardware, software, firmware and/or any combination of hardware, software and/or firmware. Thus, for example, any of the example the example receiver transmitter (RX/TX) interface 400, the example platform manager 402, the example BLE stack handler 404, the example database 406, the example BLE interface 408, the example command processor 410, the example protocol handler 412, the example security manager 414, the example RX/TX interface handler 416, the example host application 418, and/or, more generally, the example remote device BLE bridge 110 of FIG. 4 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, the example receiver transmitter (RX/TX) interface 400, the example platform manager 402, the example BLE stack handler 404, the example database 406, the example BLE interface 408, the example command processor 410, the example protocol handler 412, the example security manager 414, the example RX/TX interface handler 416, the example host application 418, and/or, more generally, the example remote device BLE bridge 110 of FIG. 4 is/are hereby expressly defined to include a non-transitory computer readable storage device or storage disk such as a memory, a digital versatile disk (DVD), a compact disk (CD), a Blu-ray disk, etc. including the software and/or firmware. Further still, the example remote device BLE bridge 110 of FIG. 4 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
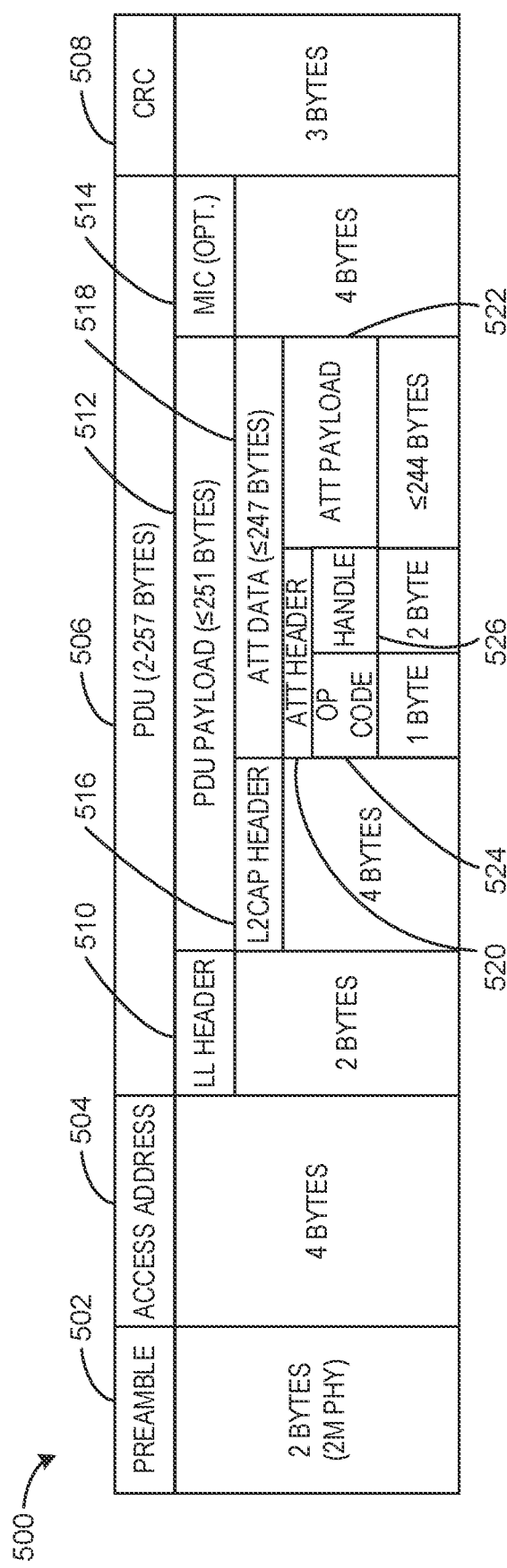
FIG. 5 is a block diagram of an example implementation of an Attribute Protocol packet.

FIG. 5 is a block diagram of an example implementation of an Attribute (ATT) protocol packet 500. The ATT protocol packet 500 of the illustrated example is a standard Bluetooth Low Energy (BLE) data packet used to transmit information over a BLE network. In the illustrated example, the ATT protocol packet 500 includes a preamble 502, an access address, 504, a protocol data unit (PDU) 506, and a cyclic redundancy check (CRC) 508. The preamble 502 of the illustrated example is a 2-byte value used for synchronization and timing of the receiver of data (e.g., the remote device 106, the field device 102, etc.). For example, a preamble value of 0xAA in a BLE packet may indicate that the BLE packet is a broadcast packet. The access address 504 of the illustrated example is a 4-byte value identifying a BLE device. For example, an access address value of a BLE packet of 0x8E89BED6 may indicate that the BLE packet is a broadcast packet.

In the illustrated example of FIG. 5, the example PDU 506 can be a value represented using a number of bytes from 2 to 257 bytes. For example, the protocol handler 312 of FIG. 3 may determine a size of the PDU 506 based on an available power for transmission of the ATT protocol packet 500 from the field device BLE bridge 104 of FIG. 3. The example PDU 506 includes a link layer (LL) header 510, which is a 2-byte value that identifies a link layer. The example PDU 506 includes an example PDU payload 512, which is a value within a range of 0 to 251 bytes. The example PDU 506 includes an optional example message integrity check (MIC) 514, which is a 4-byte value used to evaluate a data integrity of a BLE packet. The example PDU payload 512 includes an example L2CAP header 516, which is a 4-byte value identifying an L2CAP layer.

The example PDU payload 512 of the illustrated example of FIG. 5 includes example ATT data 518, which is a value in a range of 0 to 247 bytes. The example ATT data 518 includes an example ATT header 520 and an example ATT payload 522. The example ATT header 520 is a 3-byte value organized by an example opcode 524 and an example handle 526. The example opcode 524 is a 1-byte value that may correspond to an instruction or an operation to be executed. The example handle 526 is a 2-byte value that corresponds to an attribute on a generic attributes (GATT) server on a GATT layer. The example ATT payload 522 is a value within a range of 0 bytes to 244 bytes corresponding to data (e.g., field device information, a firmware executable, process data, etc.) to be transmitted to the remote device 106 and/or other devices (e.g., other field devices).

In the illustrated example of FIG. 5, there are several elements of the ATT protocol packet 500 that may be adjusted or removed. In some examples, the protocol handler 312 removes the LL header 510, the L2CAP header 516, the MIC 514, etc., prior to transmitting the ATT protocol packet 500 to the remote device 106 of FIG. 3. Additionally or alternatively, the protocol handler 312 may increase or decrease the size of the PDU 506 based on an available power budget for data transmission from the field device 102 and/or adjusting a maximum transmission unit (MTU) parameter. Further, in some examples, the example security manager 314 of FIG. 3 adjusts the ATT payload 522 by appending associated data and/or a message authentication code (MAC) to plaintext payload data, as discussed further in connection with FIG. 6.

Figure 6:
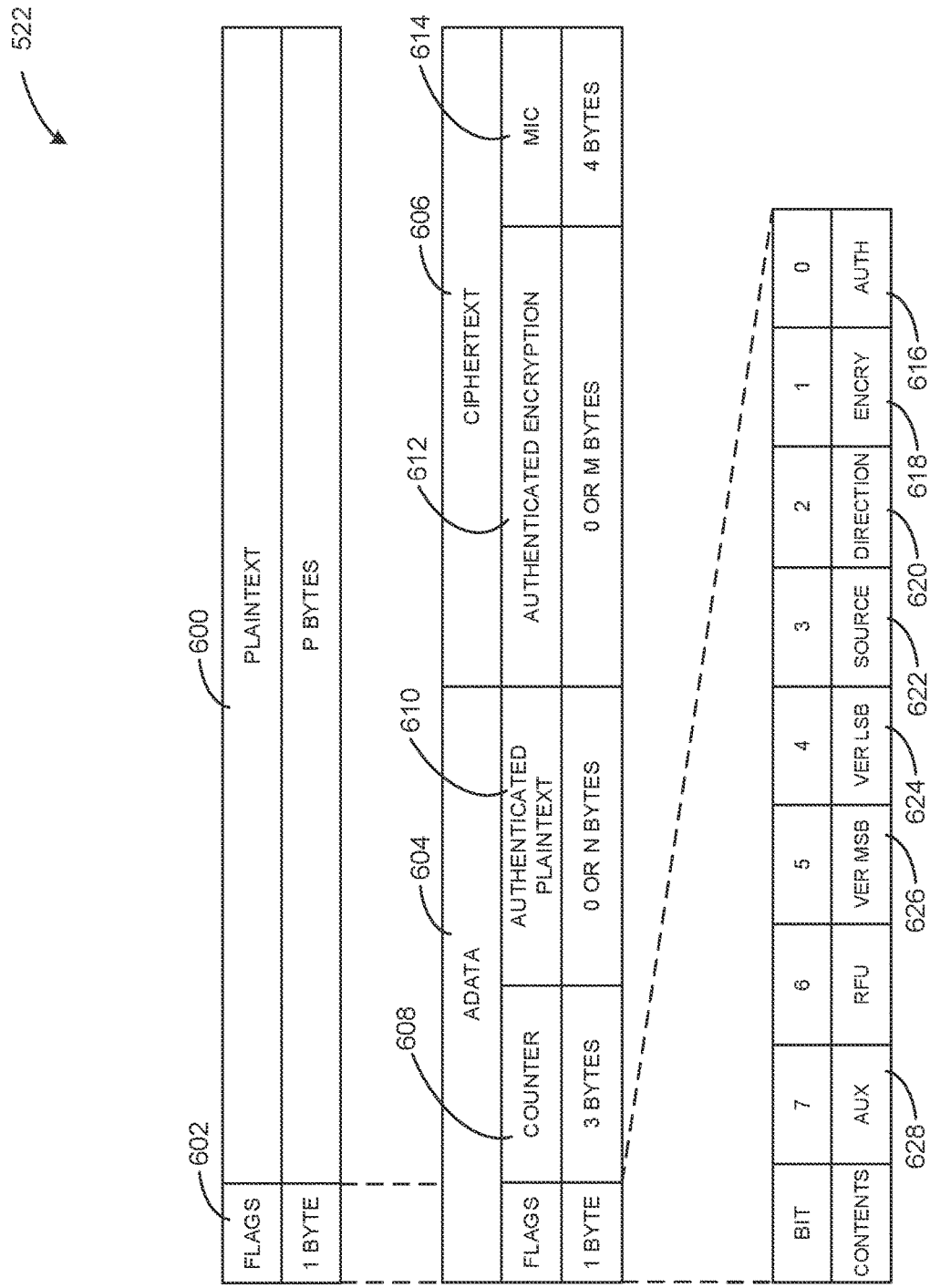
FIG. 6 is an example implementation of the ATT payload of FIG. 5.

FIG. 6 is an example implementation of the ATT payload 522 of FIG. 5. The ATT payload 522 of the illustrated example includes an example payload 600 and example flags 602. In some examples, the ATT payload 522 can be included in either a broadcast transmission or a direct connection transmission. For example, the ATT protocol packet 500 of FIG. 5 may be broadcast from the example field device 102 of FIGS. 1-4 and received by any device within a range of the example BLE network 322 of FIGS. 3 and/or 4 capable of receiving the ATT protocol packet 500 (e.g., a device having a BLE radio, such as the example remote device 106 of FIGS. 1, 3, and/or 4). Additionally or alternatively, the ATT protocol packet 500 may be transmitted from the field device 102 directly to a device with which the field device 102 has established a direct connection (e.g., a wired connection). In some such examples, the direct connection prompts the field device 102 and the remote device 106 to transmit and receive an authenticated and encrypted ATT payload 522. In some examples, the direct connection is established via a wired connection (e.g., between the field device 102 and the remote device 106). Additionally or alternatively, the direct connection between the field device 102 and the remote device 106 may be established via a wireless connection (Wi-Fi Direct, etc.).

In the illustrated example, when the field device 102 is to broadcast the ATT protocol packet 500, the ATT payload 522 of the illustrated example includes associated data 604 and ciphertext 606. The example associated data 604 further includes the flags 602, a counter 608, and authenticated plaintext 610. The ciphertext 606 of the illustrated example includes authenticated encryption data 612 and a message integrity check (MIC) 614. The example flags 602 include an authentication bit 616, an encryption bit 618, a direction bit 620, a source bit 622, a version least significant bit 624, a version most significant bit 626, and an auxiliary bit 628.

As discussed in connection with FIG. 3, the security manager 314 of FIG. 3 determines values for the flags 602 based on characteristics of the transmission of the ATT protocol packet 500. For example, the security manager 314 determines values for the authentication bit 616, the encryption bit 618, the direction bit 620, the source bit 622, the version least significant bit 624, the version most significant bit 626, the auxiliary bit 628, and/or other bits that indicate further information or that are reserved for future use. In the illustrated example, the security manager 314 determines a value for the authentication bit 616 and the encryption bit 618. For example, when the command processor 310 determines that the ATT protocol packet 500 is to be authenticated prior to transmission, the security manager 314 determines that the authentication bit 616 is to have a value of 1. Further, if the command processor 310 determines that the ATT protocol packet 500 is to be encrypted, the security manager 314 determines that the encryption bit 618 is to have a value of 1. On the other hand, when the ATT protocol packet 500 is not to be encrypted, the security manager 314 determines the that the encryption bit 618 is to have a value of 0. Similarly, when the data packet is not to be authenticated, the security manager 314 determines that the authentication bit 616 is to have a value of 0.

In some examples, the security manager 314 determines the direction bit 620 and the source bit 622 based on characteristics of the transmission of the ATT protocol packet 500. In some examples, the security manager 314 determines the direction bit 620, which indicates a direction of transmission of the ATT protocol packet 500 as either from field device 102 to the remote device 106 (e.g., or another device) or from the remote device 106 to the field device 102. In some examples, the field device 102 transmits the ATT protocol packet 500 to multiple devices (e.g., remote device 1 200, remote device 2 202, and/or remote device 3 204 of FIG. 2). In some examples, the security manager 314 determines the direction bit 620 to have a value of 0 when the ATT protocol packet 500 is transmitted from the field device 102 to the remote device 106 and determines the direction bit 620 to have a value of 1 when the ATT protocol packet 500 is transmitted from the remote device 106 to the field device 102. Alternatively, the security manager 314 may determine the direction bit 620 to have a value of 0 when the ATT protocol packet 500 is transmitted from the remote device 106 to the field device 102 and may determine the direction bit 620 to have a value of 1 when the ATT protocol packet 500 is transmitted from the field device 102 to the remote device 106.

In some examples, the security manager 314 further determines the source bit 622. The example source bit 622 indicates the method of transmission of the ATT protocol packet 500. For example, the command processor 310 of FIG. 3 determines whether the ATT protocol packet 500 will be transmitted as a broadcast transmission or transmission via a direct connection. In some examples, the security manager 314 determines the source bit 622 to have a value of 0 when the ATT protocol packet 500 is transmitted via a broadcast transmission and determines the source bit 622 to have a value of 1 when the ATT protocol packet 500 is transmitted via the connected data channel. Alternatively, the values for the different transmission mediums may be reversed (e.g., a value of 0 is used for transmission via direct connection and a value of 1 is used for a broadcast transmission). In the illustrated example, the security manager 314 further determines a value for the version least significant bit 624 and a version most significant bit 626 to be added to the flags 602.

The security manager 314 further determines a value for the auxiliary bit 628, which indicates whether the payload 600 includes auxiliary plaintext information. The auxiliary plaintext information includes additional flags, an initialization vector (e.g., discussed further in connection with FIG. 7), manufacturer specific identifiers, and/or cryptographic key identifiers. When the auxiliary bit has a value of 0, no auxiliary data is sent in the payload 600. For example, when the auxiliary bit is 0, the payload 600 includes plaintext, authenticated plaintext (e.g., within associated data 604), and/or ciphertext data (e.g., included in the ciphertext 606), and the transmission of the payload is to include information from the field device MCU 318 of FIG. 3. On the other hand, an auxiliary bit with a value of 1 indicates that the payload 600 includes plaintext data meant to be used by a device that receives the ATT protocol packet 500 (e.g., the remote device 106) for decryption and authentication of future ATT payloads 522. For example, the auxiliary data included as plaintext in the payload 600 (e.g., sent when the auxiliary bit is 1) may include an initialization vector and a cryptographic key identifier to be used to authenticate and/or decrypt future ATT payloads 522. In some examples, if the remote device 106 receives the ATT protocol packet 500 including an authenticated and/or encrypted payload, the payload 600 cannot be authenticated and/or decrypted by the remote device unless auxiliary data has been received. In some such examples, the remote device 106 buffers the ATT protocol packets received until the auxiliary data is received. In some examples, data packets including auxiliary data are interlaced with other data packets including process payload data. For example. the payload 600 may include auxiliary data in every tenth broadcast of the ATT protocol packet 500 from the field device 102. In such examples, the auxiliary plaintext information may be used by the remote device 106 to authenticate and/or decrypt the ATT protocol packets 500 received until new auxiliary plaintext information is received.

In some examples, the command processor 310 identifies whether the payload 600 of the ATT payload 522 is to be transmitted via the BLE interface 308 as plaintext, authenticated plaintext, and/or encrypted plaintext. For example, the command processor 310 may determine that the payload 600 is to be broadcast via the BLE interface 308 as plaintext because the information included in the payload 600 is not proprietary and/or can be viewed by any of the example remote devices 200-204. In some such examples, the command processor 310 may determine that the payload 600 is not to be protected during transmission. For example, the command processor 310 may determine that the division or portion of the process control system that the field device 102 is associated with does not require the payload 600 to be authenticated and/or encrypted. In some such examples, the owner of the field device 102 is not concerned with others accessing or viewing the data included in the payload 600. In some alternative examples, the command processor 310 determines that the payload 600 is to be authenticated for transmission to protect the integrity of the payload 600 within the ATT payload 522. Further, in some alternative examples, the command processor 310 determines that the payload 600 is to be encrypted for transmission via the BLE interface 308. For example, the command processor 310 may determine that the payload 600 is intended for a specific client within a refinery where multiple clients operate. In such an example, the payload 600 within the ATT payload 522 is encrypted to ensure the payload 600 is delivered to the correct recipient and other entities within the refinery cannot access the data (e.g., plaintext process data) included in the payload 600.

When the command processor 310 determines that the payload 600 is to be authenticated and/or encrypted, the security manager 314 of the illustrated example generates a nonce value that is to be used further in the generation a message authentication code (MAC) (e.g., to authenticate the ATT payload 522) and/or the encryption of the payload 600. In the illustrated example, the command processor 310 determines whether the payload 600 is to be authenticated or encrypted and does not create a payload that is authenticated in part and encrypted in part (e.g., the payload 600 is either entirely authenticated or entirely authenticated and encrypted). The encryption of the payload 600 by the example security manager 314 of FIG. 3 is discussed further in connection with FIG. 8A, and generation of the MAC for authentication of the ATT payload 522 is discussed further in connection with FIG. 8B. To generate the nonce value, the security manager 314 uses several values that are then transmitted to the remote device 106 in the auxiliary plaintext information, such as, for example, an encryption key identifier and the initialization vector, and in the flags 602, such as the counter 608, the direction bit 620, and/or the source bit 622. Generation of the nonce value is discussed further in connection with FIG. 7.

When the command processor 310 determines that the payload 600 is to be transmitted as authenticated plaintext, the payload 600 is authenticated (e.g., using the process discussed in connection with FIG. 8B) and included in the associated data 604. For example, a byte array received from the field device MCU 318 is inserted into the authenticated plaintext 610 within the associated data 604. In such examples, there is no authenticated encryption data 612 within the ciphertext 606 (e.g., no part or section of the payload 600 is not to be encrypted). The associated data 604 further includes the counter 608. The counter 608 is incremented (e.g., by one) for each ATT payload 522 that is broadcast from the field device 102. In some examples, the counter 608 is reset (e.g., to 0) when, for example, the counter 608 rolls over, a device (e.g., the field device 102) is power cycled, etc. When the counter 608 and byte array have been inserted into the associated data 604, a MAC is generated to authenticate the byte array (e.g., to create the authenticated plaintext 610), the counter 608, and the flags 602. As discussed above, there is no authenticated encryption data 612, but the ciphertext 606 does include the MIC 614. The MIC 614 is created by encrypting the MAC generated based on the flags 602, the counter 608, and the authenticated plaintext 610. Upon completion of the MIC 614, the MIC 614 and the associated data 604 are concatenated to produce the ATT payload 522. The ATT protocol packet 500 can then be broadcast by the field device 102 to transmit the payload 600 as authenticated plaintext and can be received and authenticated by the remote device 106 and/or other devices capable of receiving the ATT protocol packet 500.

When the command processor 310 determines that the payload 600 is to be transmitted as authenticated encrypted data (e.g., ciphertext), the ATT payload 522 includes the authenticated encryption data 612 and does not include the authenticated plaintext 610. In some examples, a byte array is received from the field device MCU 318 and inserted into the payload 600. The security manager 314 then authenticates the flags 602, the counter 608, and the byte array by generating a MAC. Further, the security manager 314 encrypts the MAC to generate the MIC 614 and encrypts the byte array to generate the authenticated encryption data 612. When the encryption process has been completed, the security manager 314 can concatenate the associated data 604, including the flags 602 and the counter 608, the authenticated encryption data 612, and the MIC 614 to produce the ATT payload 522 having an authenticated and encrypted payload 600. The field device 102 can further broadcast the ATT protocol packet 500 to devices within range of the BLE radio (e.g., the remote device 106) to transmit the information included in the byte array (e.g., generated by the field device MCU 318).

When the field device 106 is to transmit the ATT protocol packet 500 over a direct connection (e.g., with the remote device 106), the payload 600 is authenticated and encrypted. In such examples, however, the auxiliary bit is given a value of 0, as no auxiliary information is needed by the device receiving the ATT protocol packet 500 (e.g., the remote device 106). This is due, for example, to the handshake that occurs prior to the data transmission. During the handshake, the field device 102 shares an initialization vector and an encryption key that is to be used by the remote device 106, and therefore the remote device 106 already has the information needed to complete the decryption and authentication of the payload 600. When a data packet (e.g., a data packet to be output over the direct connection) having an industrial protocol is received by the field device BLE bridge 104 from the field device MCU 318, the protocol handler 312 of FIG. 3 first determines the industrial protocol associated with the data packet. To transmit the ATT protocol packet 500 over the direct connection, the protocol handler 312 converts the industrial protocol packet to a BLE payload (e.g., the payload 600). When the protocol handler 312 has created the payload 600, the security manager 314 generates the flags 602 (e.g., including a source bit 622 indicating the type of transmission as a direct connection transmission) and a nonce value. The nonce value is used by the security manager 314 to authenticate (e.g., by generating a MAC) the flags 602, the counter 608, and the payload 600. The payload 600 and the MAC are each encrypted (e.g., to create the authenticated encryption data 612 and the MIC 614, respectively), and the associated data 604, the authenticated encryption data 612, and the MIC 614 are concatenated to produce the ATT payload 522. The ATT protocol packet 500 can then be transmitted to the remote device 106 via direct connection, and the remote device 106 is able to authenticate and decrypt the ATT payload 522 based on the auxiliary information (e.g., the initialization vector, the encryption key, etc.) shared during the handshake between the field device 102 and the remote device 106.

In some examples, when the command processor 310 determines that the payload 600 is to be transmitted as plaintext (e.g., the security manager 314 does not authenticate or encrypt the payload 600 prior to transmission), the ATT protocol packet 500 is directed to the security manager 314 for generation of the flags 602. For example, the security manager 314 generates the flags 602 by determining values for the authentication bit 616, the encryption bit 618, the direction bit 620, and the source bit 622. Additionally or alternatively, the security manager 314 may determine values for a version least significant bit 624 and a version most significant bit 626 to be added to the header. When the payload 600 is transmitted as plaintext data, the security manager 314 determines the authentication bit 616 and the encryption bit 618 to have values of 0 (e.g., the data packet is not to be authenticated or encrypted when it is transmitted as plaintext). The security manager 314 further determines the values of the direction bit 618 and the source bit 620 in the manner previously discussed. In some examples, the security manager 314 determines the auxiliary bit 628 to have a value of 0 (e.g., because auxiliary information is not being sent out with the plaintext payload 600). Thus, the security manager 314 generates the flags 602 and appends the flags 602 to the payload 600 of the ATT payload 522.

In some examples, the security manager 414 of FIG. 4 of the remote device BLE bridge 110 can decrypt an encrypted payload 600 of an ATT protocol packet 500 received at the remote device BLE bridge 110 of the remote device 106. For example, when an ATT protocol packet 500 is received at the remote device 106, the ATT payload 522 of the ATT protocol packet 500 may be directed to the security manager 414 to authenticate and/or decrypt the ATT payload 522 prior to being directed to the example protocol handler 412 and/or the example host application 418 of FIG. 4. In some examples, the security manager 414 authenticates the integrity of the payload 600, the flags 602, and/or the associated data 604 (e.g., using the MAC). In some examples, the security manager 414 performs the authentication after decrypting the payload 600. Additionally or alternatively, the payload 600 may not be encrypted, and the security manager 414 can immediately authenticate the payload 600 (e.g., there is no decryption necessary). In some such examples, the security manager 414 may discard an ATT protocol packet 500 if the payload 600 and/or the associated data 604 is determined to not be authentic (e.g., the MAC indicates that the payload 600, the flags 602, and/or the associated data 604 have been manipulated, malformed, etc.). Authentication of the ATT protocol packet 500 at the remote device 106 is discussed further in connection with FIG. 8B. In some examples, the payload 600 is not encrypted, and when the security manager 414 has authenticated the payload 600, the flags 602, and/or the associated data 604, the ATT payload 522 may be directed to the protocol handler 412 and/or the host application 418.

When the security manager 314 receives the ATT payload 522 including the authenticated and encrypted payload 600, the security manager 414 can decrypt the MIC 614 and the authenticated encryption data 612. For example, the security manager 414 can receive an encryption key identifier in auxiliary data (e.g., interlaced in transmissions of data packets) that indicates to the security manager 414 which encryption key is to be used in decrypting the authenticated encryption data 612. In some examples, the security manager 414 has access to a number of pre-shared keys (e.g., keys known to the security manager 414). In some such examples, the pre-shared keys are included in an application located outside of the remote device 106 that can be accessed by the security manager 414. The security manager 414 further accesses additional data (e.g., an initialization vector, additional flags, etc.) included in the auxiliary information previously transmitted in the ATT payload 522. Using this information, the security manager 414 can use the auxiliary information, as well as the flags 602 and the counter 608, to generate a nonce value and decrypt the authenticated encryption data 612. The additional data can be used to determine the nonce value that was used during encryption of the payload 600 by the field device 102 prior to transmission of the ATT protocol packet 500 to the remote device 106. When the security manager 414 has determined the nonce value, the nonce value is used in combination with the encryption key identifier to decrypt the payload 600, as discussed further in connection with FIGS. 8A and 8B.

FIG. 7 is an implementation of an example nonce value 700 generated by the example field device 102 of FIGS. 1-4 and/or the remote device 106 of FIGS. 1, 3, and/or 4. The example nonce value 700 is used as an input to an example encryption algorithm (e.g., an AES-128 Block Cipher), as discussed further in connection with FIGS. 8A and 8B. In some examples, the nonce value 700 is generated by the example security manager 314 of FIG. 3. Additionally or alternatively, the nonce value 700 is generated by the example security manager 414 of FIG. 4 included in the example remote device BLE bridge 110. In the illustrated example, the nonce value 700 includes 13 bytes. Additionally or alternatively, the nonce value 700 may include a greater or fewer number of bytes.

The example nonce value 700 is initially generated by, for example, the security manager 314 of FIG. 3 prior to transmission of a data packet (e.g., the ATT protocol packet 500 of FIG. 5) from the field device 102 to the remote device 106 over the BLE network 322. In some examples, the security manager 314 generates the nonce value 700 based on the direction bit 618 and the source bit 620 included in the flags 602 of FIG. 6, an initialization vector transmitted with auxiliary data (e.g., as discussed in connection with FIG. 6), and/or the counter 608 of FIG. 6. In the illustrated example, the security manager 314 generates the nonce value 700 as a 13-byte nonce value. In some examples, the 13-byte nonce value 700 includes a 3-byte counter 608 (e.g., a counter having bytes 0-2), a 9 byte initialization vector (e.g., an initialization vector having bytes 0-8), and a byte based on the direction bit 618 and the source bit 620. For example, the security manager 314 generates an example zeroth byte 702 (e.g., byte 0) of the nonce value 700 based on a zeroth byte of the counter 608 (e.g., byte 0 of the counter 608). The security manager 314 further generates two additional bytes of the nonce value (e.g., an example first byte 704 and an example second byte 706) using two bytes of the counter 608 (e.g., bytes 1 and 2 of the counter 608). To generate the third byte 708 of the nonce value 700, the security manager 314 uses the direction bit 620 and the source bit 622 included in the flags 602.

The security manager 314 further generates 9 bytes of the nonce value 700 using the 9-byte initialization vector. For example, a fourth byte 710 of the nonce value 700 includes a zeroth byte of the initialization vector, a fifth byte 712 of the nonce value 700 includes a first byte of the initialization vector, etc. The final two bytes of the nonce value 700 (e.g., an example eleventh byte 714 and an example twelfth byte 716) include the final bytes of the initialization vector (e.g., the seventh and eighth bytes of the initialization vector). Further, the fourth byte 708 of the nonce value 700 is the least significant byte of the initialization vector and the twelfth byte 716 of the nonce value 700 is the most significant byte of the initialization vector. In some examples, the initialization vector is included in the auxiliary information broadcast from the field device 102 (e.g., for a broadcast data transmission). In such examples, the security manager 414 of FIG. 4 can use the initialization vector included in the auxiliary information to determine the nonce value. In some alternative examples, the initialization vector is obtained during a handshake between the field device 102 and the remote device 106 and can be used by the when the data packet is transmitted via a direct connection. In some examples, the initialization vector does not change throughout a connection session while the field device 102 is directly connected to the remote device 106. When the nonce value 700 has been generated by the example security manager 314 of FIG. 3 or the security manager 414 of FIG. 4, the nonce value 700 may be used as an input to the encryption algorithm discussed further in connection with FIGS. 8A and 8B.

FIG. 8A is an illustrated example of a counter with cipher block chaining (CBC)-MAC (CCM) mode encryption method 800. In the CCM mode encryption method 800, a nonce value (e.g., the example nonce value 700 of FIG. 7) and an example encryption key 804 (e.g., a secret encryption key included in the auxiliary information discussed in connection with FIG. 6) serve as inputs into an example AES-256 Block Cipher 806. The nonce value 700 is further appended to a counter (e.g., different from the counter 608 of FIG. 6) to create input blocks 700a, 700b, and 700c. For example, the first input block 700a is generated by appending the nonce value 700 to a counter where the counter has a value of 0. Further, the second input block 700b is generated by appending the nonce value 700 to the counter where the counter has a value of 1. The final input block 700c is then generated based on the nonce value 700 appended to a final value of the counter (e.g., depending on the size of the payload 600). Additionally or alternatively, the CCM mode encryption method 800 may use a different block cipher, such as an AES-128 Block Cipher. The AES-256 Block Cipher 806 outputs an example first adder 808a that is based on the first input block 700a and the encryption key 804. In some examples, the payload 600 (e.g., including a CBC-MAC) is segmented into 128-bit blocks of data, and each of the 128-bit blocks is input into the AES-128 Block Cipher 806 and combined after the encryption process. The adder 808 is then combined with a portion of the example payload 600 of FIG. 6. For example, in FIG. 8A, a first 128-bit plaintext portion 600a of the payload 600 can be combined with the adder 808 to generate a first 128-bit ciphertext output 810a. In some examples, the first 128-bit plaintext portion 600a is a CBC-MAC (e.g., generated using the method of FIG. 8B) that is to be encrypted to create a MIC. In such examples, the remaining 128-bit plaintext portions 600b-600c include the payload 600 of FIG. 6.

The CCM mode encryption method 800 further generates the second adder 808b based on inputting the second input block 700b and the encryption key 804 into the AES-256 Block Cipher 806 and combines the second adder 808b with the second 128-bit portion 600b of the payload 600. In such an example, a second 128-bit ciphertext output 810b is output by combining the second 128-bit ciphertext output 810b and the second adder 808b. The CCM mode encryption method 800 continues to generate 128-bit ciphertext outputs until the payload 600 has been completely encrypted. The final input block 700c is combined and the encryption key 804 are input into the AES-256 Block Cipher 806 to produce the final adder 808c. This final adder 808c can be combined with the final 128-bit portion 600c of the payload 600 to generate the final 128-bit ciphertext output 810c. The final step of the CCM mode encryption method 800 includes concatenating the 128-bit ciphertext outputs 810a-810c to create an encrypted payload (e.g., the authenticated encryption data 612 of FIG. 6). In some examples, the payload 600 is process data associated with a process control system (e.g., process values, alarms, etc.). For example, the payload 600 may be process data obtained by the example field device 102 of FIGS. 1-4 that is to be output by the example field device BLE bridge 104. The adder 808 thus encrypts the payload 600 to create the example encrypted payload 810.

In some examples, when the payload 600 has been encrypted and associated data (e.g., the associated data 604 of FIG. 6) has been appended to the authenticated encryption data 612, the authenticated encryption data 612 and the associated data 604 are authenticated. Authentication of the authenticated encryption data 612 and the associated data 604 is discussed in connection with FIG. 8B. The CCM mode encryption method 800 of the illustrated example can further be used to create a MIC (e.g., the MIC 614 of FIG. 6) by encrypting the MAC generated using the method illustrated in FIG. 8B. In some examples, when the payload 600 and MIC 614 have been encrypted, the field device 102 transmits a data packet (e.g., the ATT protocol packet 500 of FIG. 5) with the authenticated encryption data 612 to the example remote device 106 of FIGS. 1, 3, and/or 4. In some examples, the security manager 414 included in the remote device 106 receives the authenticated encryption data 612 and the MIC 614 and decrypts the MIC 614 and the authenticated encryption data 612 using the AES-256 Block Cipher 806. For example, the security manager 414 may generate the nonce value 700 (e.g., as discussed in connection with FIG. 7) and may access the encryption key 804 used by the security manager 314 included in the field device 102. In some such examples, the security manager 414 identifies the encryption key 804 from the auxiliary information discussed in connection with FIG. 6 and accesses the encryption key 804 from a set of pre-shared keys. In the illustrated example, the security manager 414 further inputs the nonce value 700 and the encryption key 804 into the AES-256 Block Cipher 806, which outputs example adders 808a-808c. In some examples, the adders 808a-808c are combined with respective 128-bit ciphertext outputs 810a-810c to decrypt the authenticated encryption data 612, thus generating the payload 600. In such examples, the payload 600 is plaintext data that can be further accessed by the remote device 106 (e.g., by the example protocol handler 412 and/or the example host application 418 of FIG. 4).

FIG. 8B is an illustrated example of a cipher block chaining-message authentication code (CBC-MAC) method 812 for generating a message authentication code (MAC) (e.g., the MAC discussed in connection with FIG. 6). For example, the security manager 314 included in the field device 102 may generate the MAC using the CBC-MAC method 812 for an example payload (e.g., the payload 600 of FIG. 6) and/or example associated data (e.g., the associated data 604 of FIG. 6) prior to transmission of a data packet. In the illustrated example, the payload 600 and the associated data 604 are segmented into block $B_0$ 814, block $B_1$ 816, and block $B_r$ 818 by the security manager 314. In some examples, additional blocks exist between block $B_1$ 816 and block $B_r$ 818 that operate in the same manner as the blocks 814-818. In some examples, each of the blocks 814-818 includes 128 bits of data from the payload 600 and/or the associated data 604. Additionally or alternatively, the blocks 814-818 may each include 256 bits of data from the payload 600 and/or the associated data 604. In some examples, the payload 600 is encrypted prior to the use of the CBC-MAC method 812 (e.g., using the CCM mode encryption method 800 illustrated in FIG. 8A).

In the illustrated example, the block $B_0$ 814 is input into the example AES-256 Block Cipher 806. In some examples, the CBC-MAC method 812 uses a different block cipher (e.g., AES-128) or uses a hashing algorithm (e.g., HMAC). The AES-256 Block Cipher 806 further receives the example encryption key 804 as an input. In some examples, the security manager 314 determines the encryption key 804 that is to be used from the auxiliary information. In the illustrated example, the encryption key 804 is the same encryption key used in the CCM mode encryption method 800 of FIG. 8A. Alternatively, the CBC-MAC method 812 may use a different encryption key 804. Based on the inputs (e.g., the block $B_0$ 814 and the encryption key 804), the AES-256 Block Cipher 806 outputs an example first ciphertext block 820. In the illustrated example, the first ciphertext block 820 is combined (e.g., chained) with block $B_1$ 816, which serves as a new input to the AES-128 Block Cipher 806 along with the encryption key 804. The AES-128 Block Cipher 806 then outputs an example second ciphertext block 822 and the process begins again (e.g., the second ciphertext block 822 is combined or chained with another plaintext data block and input into the AES-128 Block Cipher 806). In the illustrated example, the block $B_r$ 818 is combined with a ciphertext block output in the previous step to serve as an input to the AES-128 Block Cipher 806, and the AES-256 Block Cipher 806 outputs the MAC. In some examples, the MAC output by the AES-256 Block Cipher 806 is a 3-byte MAC. In some examples, the MAC is then appended to the payload 600 and encrypted (e.g., using the CCM mode encryption method 800 of FIG. 8A).

When the example remote device BLE bridge 110 of FIGS. 1-4 receives a data packet at the remote device 106 that includes the MIC 614, the example security manager 414 of FIG. 4 may decrypt the MIC 614 to generate the MAC and then authenticate the payload 600 and the associated data 604 using the CBC-MAC method 812. For example, the security manager 414 of the remote device 106 may use the CBC-MAC method 812 that was also used by the security manager 314 of the field device 102 to validate the MAC and, thus, authenticate the payload 600 and the associated data 604 (e.g., to check for manipulation, deletion, etc., of the payload 600 or the associated data 604). The security manager 414 segments the payload 600 and the associated data 604 into the blocks 814-818. The security manager 414 further inputs the block $B_0$ 814 into the AES-256 Block Cipher 806 along with the encryption key 804 to generate the first ciphertext block 820. In some examples, security manager 414 determines the encryption key 804 to be used based on the auxiliary information. For example, auxiliary information identifies the encryption key 804 used by the security manager 314 of the field device 102 when generating the MAC, which allows the security manager 414 of the remote device 106 to generate the same value for the MAC.

The security manager 414 further combines the first ciphertext block 820 with the block $B_1$ 816 and serves the combined value as a new input to the AES-256 Block Cipher 806 along with the encryption key 804. The second ciphertext block 822 is thus output, and the procedure is repeated until the final block, block $B_r$ 818, is combined with the previous ciphertext block and input into the AES-256 Block Cipher 806 along with the encryption key 804. The MAC is output by the AES-256 Block Cipher 806 and may further be compared to the value of the MAC appended to the payload 600 (e.g., originally the MIC 614, but now decrypted to be a MAC). If the two values match, the security manager 414 verifies the integrity of the data packet and accepts the data packet. On the other hand, if the security manager 414 determines that the values of the two MACs do not match, the security manager 414 may reject the data packet.

Flowcharts representative of example hardware logic, machine readable instructions, hardware implemented state machines, and/or any combination thereof for implementing the field device BLE bridge 104 of FIG. 3 are shown in FIGS. 9A-9D. The machine readable instructions may be an executable program or portion of an executable program for execution by a computer processor such as the processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowcharts illustrated in FIG. 9A-9D, many other methods of implementing the example field device BLE bridge 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 9A-9D may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 9A:
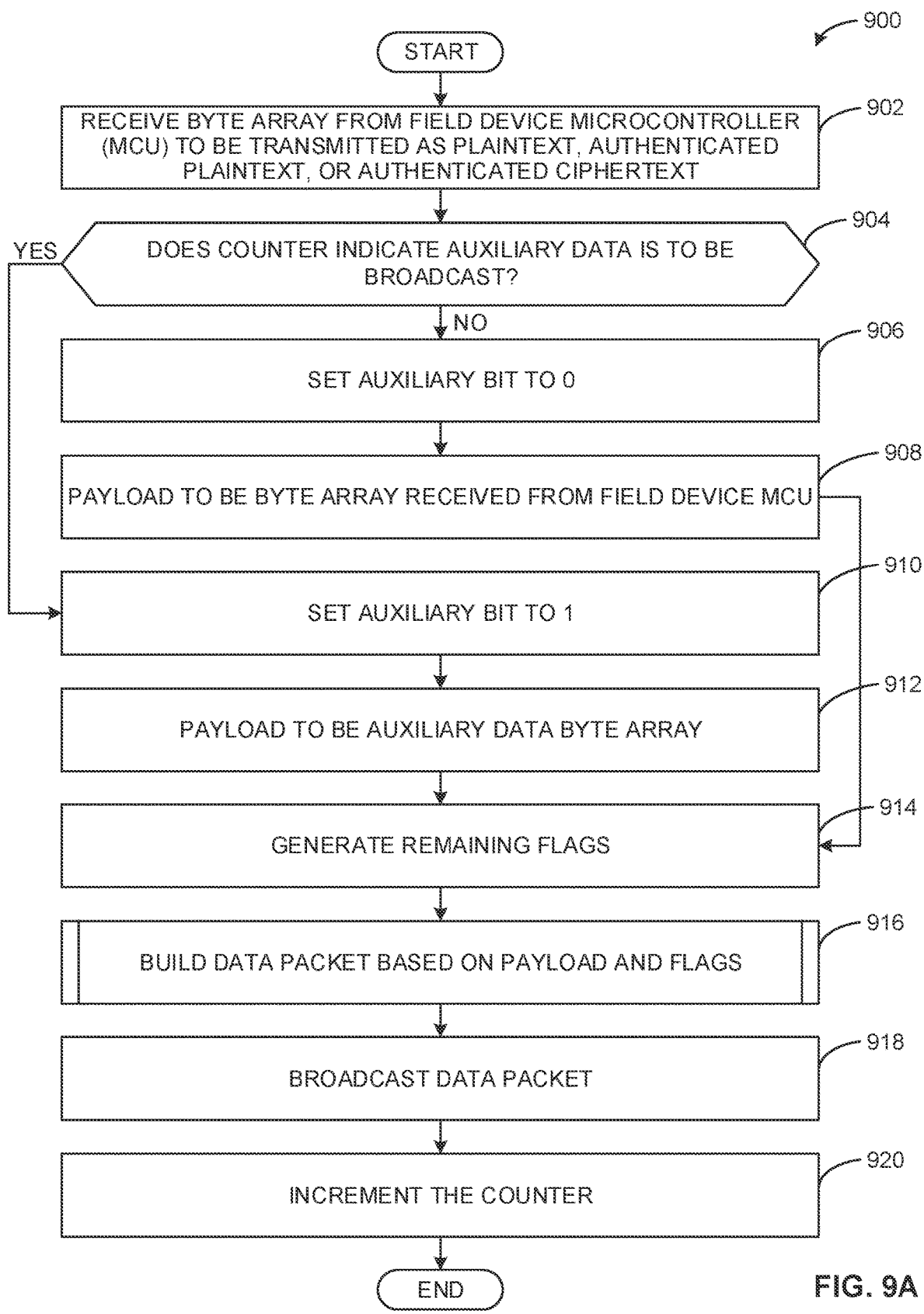
FIG. 9A is a flowchart representative of machine readable instructions that may be executed to implement the example field device BLE bridge of FIGS. 1-4 to broadcast a data packet from the example field device of FIGS. 1-4.

FIG. 9A is a flowchart representative of machine readable instructions that may be executed to implement the example field device BLE bridge 104 of FIGS. 1-3 to broadcast a data packet from the example field device 102 of FIGS. 1-4. The example process 900 begins at block 902 where the field device BLE bridge 104 receives a byte array from a field device microcontroller (MCU) 318 to be transmitted as plaintext, authenticated plaintext, or authenticated ciphertext. For example, the example command processor 310 of FIG. 3 may receive a data packet from the field device MCU 318 that includes process data obtained by the field device 102. The command processor 310 is further instructed to transmit the byte array as a plaintext payload (e.g., the payload 600 of FIG. 6) within a data packet (e.g., the ATT protocol packet 500 of FIG. 5).

At block 904, the field device BLE bridge 104 determines whether a counter (e.g., the counter 608 of FIG. 6) indicates that auxiliary data (e.g., discussed in connection with FIG. 6) is to be broadcast. For example, the command processor 310 may determine a value of the counter 608 to determine if it is a multiple of 10 when the auxiliary data is to be transmitted every tenth message. When the command processor 310 determines that the auxiliary data is to be broadcast, control of process 900 proceeds to block 910. When the command processor 310 determines that the auxiliary data is not to be broadcast, control of process 900 proceeds to block 906.

At block 906, the field device BLE bridge 104 sets an auxiliary bit (e.g., the auxiliary bit 628 of FIG. 6) to 0. For example, the security manager 314 may generate the auxiliary bit 628, which indicates whether the ATT payload 522 includes auxiliary information and determine the value of the auxiliary bit to be 0 (e.g., because the ATT payload 522 does not include auxiliary information). In some examples, the auxiliary bit 628 is included within the flags 602 of FIG. 6 and can be set to a value of 0 (e.g., no auxiliary information) or 1 (e.g., the ATT payload 522 includes auxiliary information).

At block 908, the field device BLE bridge 104 determines that the payload (e.g., the payload 600) is to be the byte array received from the field device MCU 318. For example, when the security manager 314 determines that the auxiliary information is not to be transmitted in the ATT payload 522, the security manager 314 determines that the payload 600 is to include the byte array (e.g., process data obtained by the field device 102).

The field device BLE bridge 104 further sets the auxiliary 628 bit to 1 (block 910). For example, the example security manager 314 may generate the auxiliary bit 628 of the flags 602 to be 1 because the auxiliary information is to be broadcast from the field device 102 within the ATT payload 522. At block 912, the field device BLE bridge 104 determines that the payload 600 is to be the auxiliary data byte array. For example, when the security manager 314 determines that the auxiliary data is to be broadcast from the field device 102, the security manager 314 inserts the auxiliary data into the payload 600. In some examples, the auxiliary data includes an initialization vector (e.g., used in the generation of the nonce value 700 of FIG. 7), an encryption key identifier (e.g., used to select an encryption key), additional flags, and/or other information.

The field device BLE bridge 104 further generates the remaining flags 602 (block 914). For example, the security manager 314 may generate the authentication bit 616, the encryption bit 618, the direction bit 620, the source bit 622, the version least significant bit 624, and/or the version most significant bit 626 in addition to the previously-generated auxiliary bit 628 (e.g., generated at block 906 or block 910). The flags 602 indicate the state of the payload 600 (e.g., plaintext, authenticated plaintext, authenticated and encrypted plaintext, etc.), a direction of the ATT protocol packet 500 (e.g., to or from the field device 102), a type of transmission (e.g., broadcast or direct connection), and/or other information regarding the payload 600 or the ATT protocol packet 500.

Figure 9B:
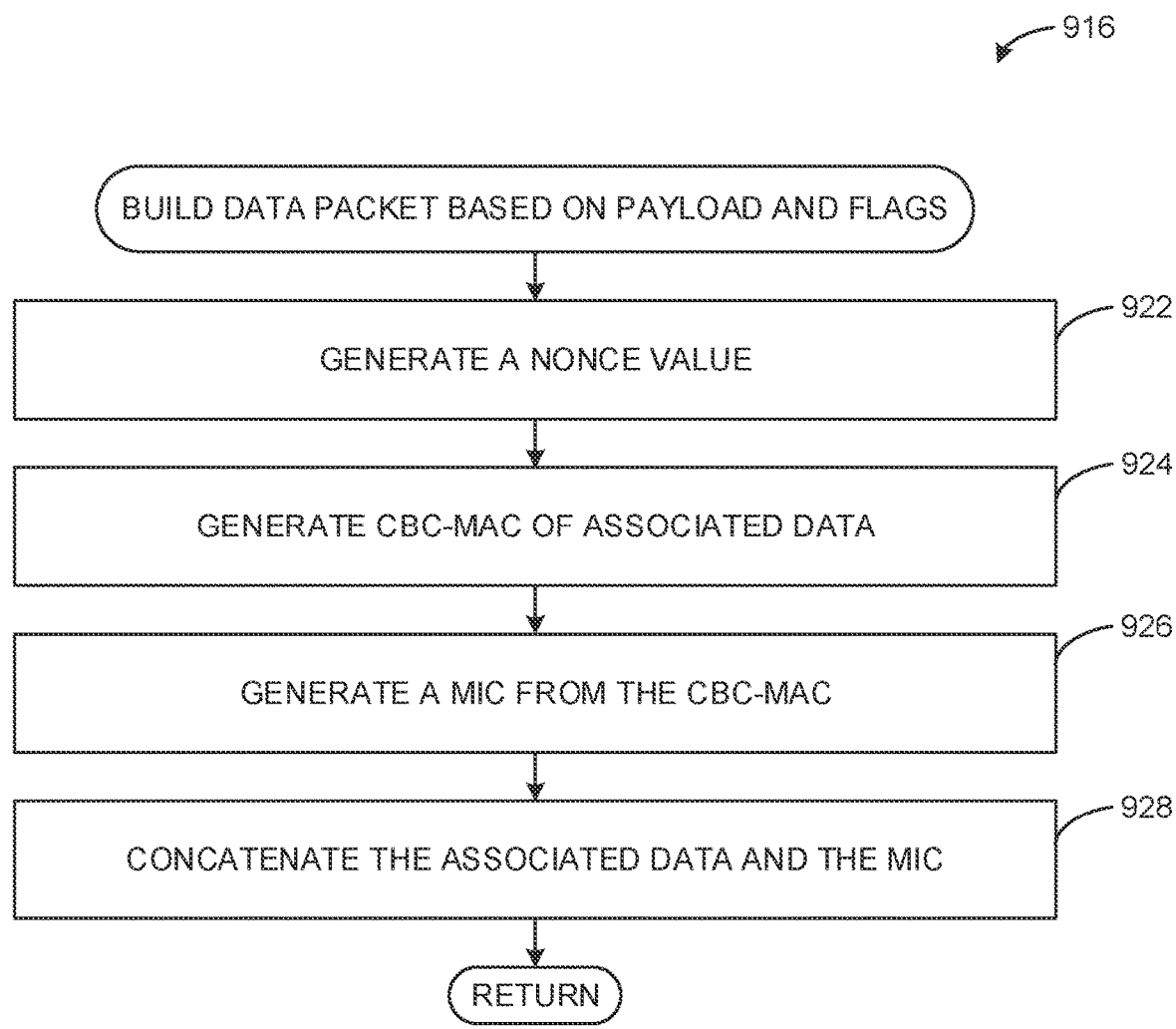
FIG. 9B is a flowchart representative of machine readable instructions that may be executed to implement the example field device BLE bridge 104 of FIGS. 1-4 to build a data packet based on the payload 600 and the flags 602 when the payload 600 is to be authenticated.
Figure 9C:
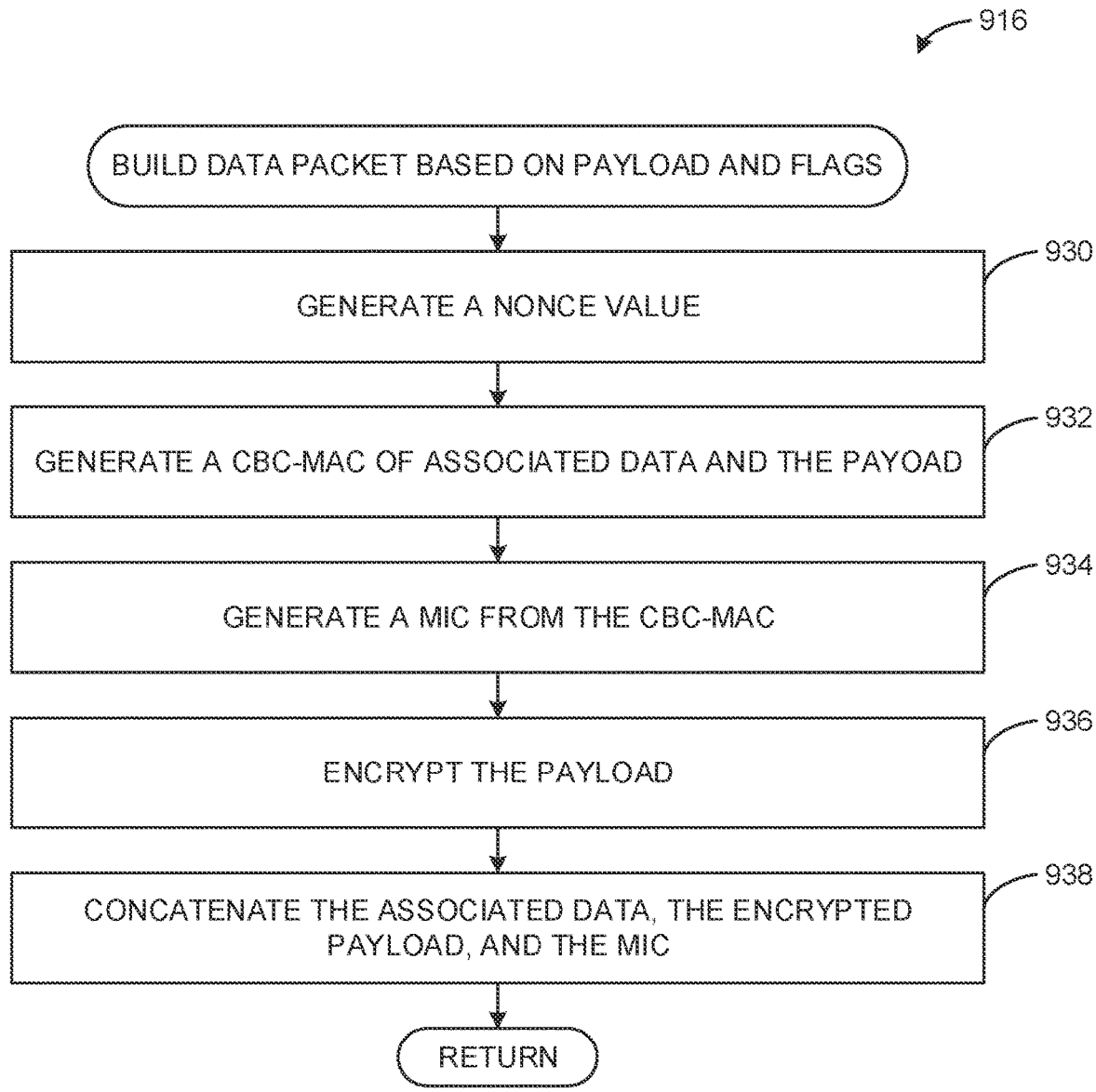
FIG. 9C is a flowchart representative of machine readable instructions that may be executed to implement the example field device BLE bridge 104 of FIGS. 1-4 to build a data packet based on the payload 600 and the flags 602 when the data packet is to be authenticated and encrypted.

At block 916, the field device BLE bridge 104 builds a data packet based on the payload 600 and the flags 602. For example, the security manager 314 builds the ATT payload 522 based on the payload 600 and the flags 602. In some examples, the payload 600 includes associated data (e.g., the associated data 604 of FIG. 6) and ciphertext (e.g., the ciphertext 606). In such examples, the associated data 604 is not encrypted, but may be authenticated, and the ciphertext 606 is encrypted. In some examples, the byte array received from the field device MCU 318 is authenticated and not encrypted, and, in such examples, the byte array is included in the associated data 604. Alternatively, the security manager 314 may determine that the byte array received from the field device MCU 318 is to be authenticated and encrypted, and the security manager 314 therefore includes the byte array within the ciphertext 606. FIG. 9B illustrates an implementation of block 916 where the byte array is authenticated and not encrypted, and FIG. 9C illustrates an implementation of block 916 where the byte array is authenticated and encrypted. When the byte array is to be broadcast as plaintext, the payload 600 is not broken into the associated data 604 and the ciphertext 606. For example, the byte array is used as the payload 600 and is broadcast from the field device 102 along with the flags 602.

At block 918, the field device BLE bridge 104 broadcasts the data packet (e.g., the ATT protocol packet 500). For example, the security manager 314 may transmit the ATT protocol packet 500 including the payload 600 (e.g., as plaintext, authenticated plaintext, or authenticated and encrypted plaintext) to the BLE interface 308 of FIG. 3. The BLE interface 308 further broadcasts the ATT protocol packet 500 over the example BLE network 322.

The field device BLE bridge 104 further increments the counter 608 (block 920). For example, the security manager 314 increments the counter 608 by one to update the counter 608. In some examples, the counter 608 indicates whether the payload 600 is to include auxiliary information or the byte array received from the field device MCU 318. Additionally or alternatively, incrementing the counter 608 allows a new nonce value to be generated for the next data packet that is to be transmitted. For example, the nonce value (e.g., the nonce value 700 of FIG. 7) is unique even when the initialization vector is the same because the counter is incremented.

FIG. 9B is a flowchart representative of machine readable instructions that may be executed to implement the example field device BLE bridge 104 of FIGS. 1-4 to build a data packet based on the payload 600 and the flags 602 when the payload 600 is to be authenticated and not encrypted. The process 916 begins at block 922 where the field device BLE bridge 104 generates a nonce value (e.g., the nonce value 700 of FIG. 7). For example, the security manager 314 can generate the nonce value 700 based on the flags 602, an initialization vector, and/or the counter 608. For example, the security manager 314 can generate the nonce value 700 based on the direction bit 620 and the source bit 622 from the flags 602, the initialization vector, and the counter 608 to generate the nonce value 700 (e.g., as discussed further in connection with FIG. 7).

At block 924, the field device BLE bridge 104 generates a cipher block chain (CBC)-message authentication code (MAC) of the associated data 604. For example, the security manager 314 may generate the CBC-MAC for the associated data 604 using the CBC-MAC (e.g., also referred to herein as a MAC) method 812 discussed in connection with FIG. 8B. The MAC thus authenticates all of the associated data 604, including the flags 602, the counter 608, and/or the authenticated plaintext 610.

The field device BLE bridge 104 further generates a MIC (e.g., the MIC 614 of FIG. 6) from the CBC-MAC (block 926). For example, the security manager 314 uses the CCM mode encryption method 800 of FIG. 8A to encrypt the CBC-MAC generated at block 924. At block 928, the field device BLE bridge 104 concatenates the associated data 604 and the MIC 614. For example, the security manager 314 may concatenate the associated data 604 and the MIC 614 to finish building the ATT payload 522 that is to be transmitted within the ATT protocol packet 500. When the associated data 604 and the MIC 614 have been concatenated, the control returns to block 918 of process 900, where the authenticated data packet is to be broadcast by the field device 102.

FIG. 9C is a flowchart representative of machine readable instructions that may be executed to implement the example field device BLE bridge 104 of FIGS. 1-4 to build a data packet based on the payload 600 and the flags 602 when the data packet is to be authenticated and encrypted. The example process 916 begins at block 930, where the field device BLE bridge 104 generates a nonce value (e.g., the nonce value 700 of FIG. 7). For example, the security manager 314 can generate the nonce value 700 based on the flags 602, an initialization vector, and/or the counter 608. For example, the security manager 314 can generate the nonce value 700 based on the direction bit 620 and the source bit 622 from the flags 602, the initialization vector, and the counter 608 to generate the nonce value 700 (e.g., as discussed further in connection with FIG. 7).

At block 932, the field device BLE bridge 104 generates a CBC-MAC of the associated data 604 and the payload 600. For example, the security manager 314 may generate the CBC-MAC for the associated data 604 and the payload 600 (e.g., the payload 600 included within the ciphertext 606) using the CBC-MAC method 812 discussed in connection with FIG. 8B. The MAC thus authenticates all of the associated data 604, including the flags 602 and/or the counter 608 and the payload 600. The field device BLE bridge 104 further generates a MIC (e.g., the MIC 614 of FIG. 6) from the CBC-MAC (block 934). For example, the security manager 314 uses the CCM mode encryption method 800 of FIG. 8A to encrypt the CBC-MAC generated at block 934. At block 936, the field device BLE bridge 104 encrypts the payload 600. For example, using the CCM mode encryption method 800, the security manager 314 may encrypt the payload 600. The encryption of the payload 600 occurs after the payload 600 is authenticated.

At block 938, the field device BLE bridge 104 concatenates the associated data 604, the encrypted payload (e.g., the authenticated encryption data 612), and the MIC 614. When the concatenation is complete, the ATT payload 522 includes an authenticated an encrypted payload, and the ATT protocol packet 500 is ready to be broadcast by the field device 102. Control of process 916 then returns to block 918 of FIG. 9A, where the field device 102 broadcasts the ATT protocol packet 500 (e.g., over the BLE network 322 of FIG. 3).

Figure 9D:
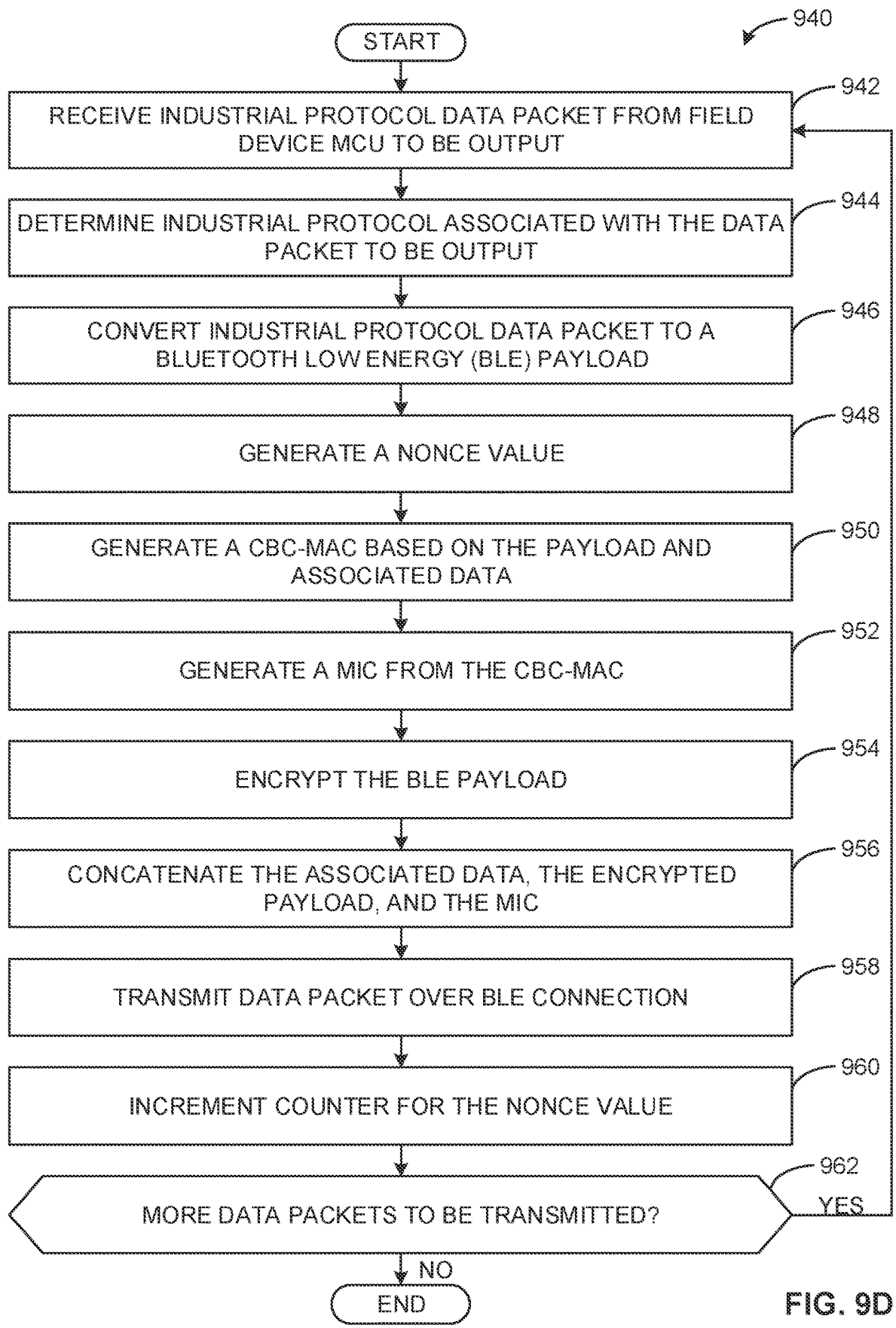
FIG. 9D is a flowchart representative of machine readable instructions that may be executed to implement the example field device BLE bridge of FIGS. 1-4 to transmit a data packet via a direct connection.

FIG. 9D is a flowchart representative of machine readable instructions that may be executed to implement the example field device BLE bridge 104 of FIGS. 1-4 to transmit a data packet (e.g., the ATT protocol packet 500 of FIG. 5) via a direct connection. The example process 940 begins at block 942 where the field device BLE bridge 104 receives an industrial protocol data packet from a field device MCU (e.g., the field device MCU 318 of FIG. 3) to be output. For example, the command processor 310 may receive an industrial protocol packet from the field device MCU 318 that is to be transmitted to a device (e.g., the remote device of FIGS. 1, 3, and/or 4) via a direct connection.

The field device BLE bridge 104 further determines an industrial protocol associated with the industrial protocol data packet to be output (block 944). For example, the protocol handler 312 may determine an industrial protocol, such as a HART protocol, a PROFIBUS protocol, etc., of the industrial protocol data packet received from the field device MCU.

At block 946, the field device BLE bridge 104 converts the industrial protocol data packet to a BLE payload (e.g., the ATT payload 522). For example, the protocol handler 312 may determine that the industrial protocol data packet supporting information (e.g., a preamble, an address, etc.) are to be removed to convert the industrial protocol data packet to a form consistent with the ATT payload 522.

The field device BLE bridge 104 further generates a nonce value (e.g., the nonce value 700 of FIG. 7) (block 948). For example, the security manager 314 can generate the nonce value 700 based on the flags 602, an initialization vector, and/or the counter 608. In some examples, the security manager 314 generates the nonce value 700 based on the direction bit 620 and the source bit 622 from the flags 602, the initialization vector, and the counter 608 to generate the nonce value 700 (e.g., as discussed further in connection with FIG. 7).

At block 950, the field device BLE bridge 104 generates a CBC-MAC based on the payload 600 and the associated data 604. For example, the security manager 314 may generate the CBC-MAC for the associated data 604 and the payload 600 (e.g., the payload 600 included within the ciphertext 606) using the CBC-MAC method 812 discussed in connection with FIG. 8B. The MAC thus authenticates all of the associated data 604, including the flags 602 and/or the counter 608 and the payload 600. The field device BLE bridge 104 further generates a MIC (e.g., the MIC 614 of FIG. 6) from the CBC-MAC (block 952). For example, the security manager 314 uses the CCM mode encryption method 800 of FIG. 8A to encrypt the CBC-MAC generated at block 934. At block 954, the field device BLE bridge 104 encrypts the payload 600. For example, using the CCM mode encryption method 800, the security manager 314 may encrypt the payload 600. The encryption of the payload 600 occurs after the payload 600 is authenticated.

At block 956, the field device BLE bridge 104 concatenates the associated data 604, the encrypted payload (e.g., the authenticated encryption data 612), and the MIC 614. When the concatenation is complete, the ATT payload 522 includes an authenticated and encrypted payload, and the ATT protocol packet 500 is ready to be transmitted via the direct connection between the field device 102 and the remote device 106. The field device BLE bridge 104 further transmits the data packet (e.g., the ATT protocol packet 500) over the BLE connection (e.g., the direct connection between the field device 102 and the remote device 106) (block 958). For example, the BLE interface 308 may transmit the ATT protocol packet 500 to only the remote device 106 (e.g., the ATT protocol packet 500 is not broadcast over the BLE network 322 to any device within range of the field device 102).

At block 960, the field device BLE bridge 104 increments a counter (e.g., the counter 608 of FIG. 6) for the nonce value 700. For example, the security manager 314 increments the counter 608 by one to update the counter 608. In some examples, incrementing the counter 608 allows a new nonce value to be generated for the next data packet that is to be transmitted over the BLE connection. For example, the nonce value (e.g., the nonce value 700 of FIG. 7) is unique even when the initialization vector is the same because the counter 608 is incremented. At block 962, the field device BLE bridge 104 determines whether more data packets are to be transmitted. For example, the command processor 310 may determine whether additional industrial protocol data packets are received from the field device MCU 318. When more data packets are to be transmitted, control of process 940 returns to block 942. When more data packets are not to be transmitted, control of process 940 concludes.

Figure 10A:
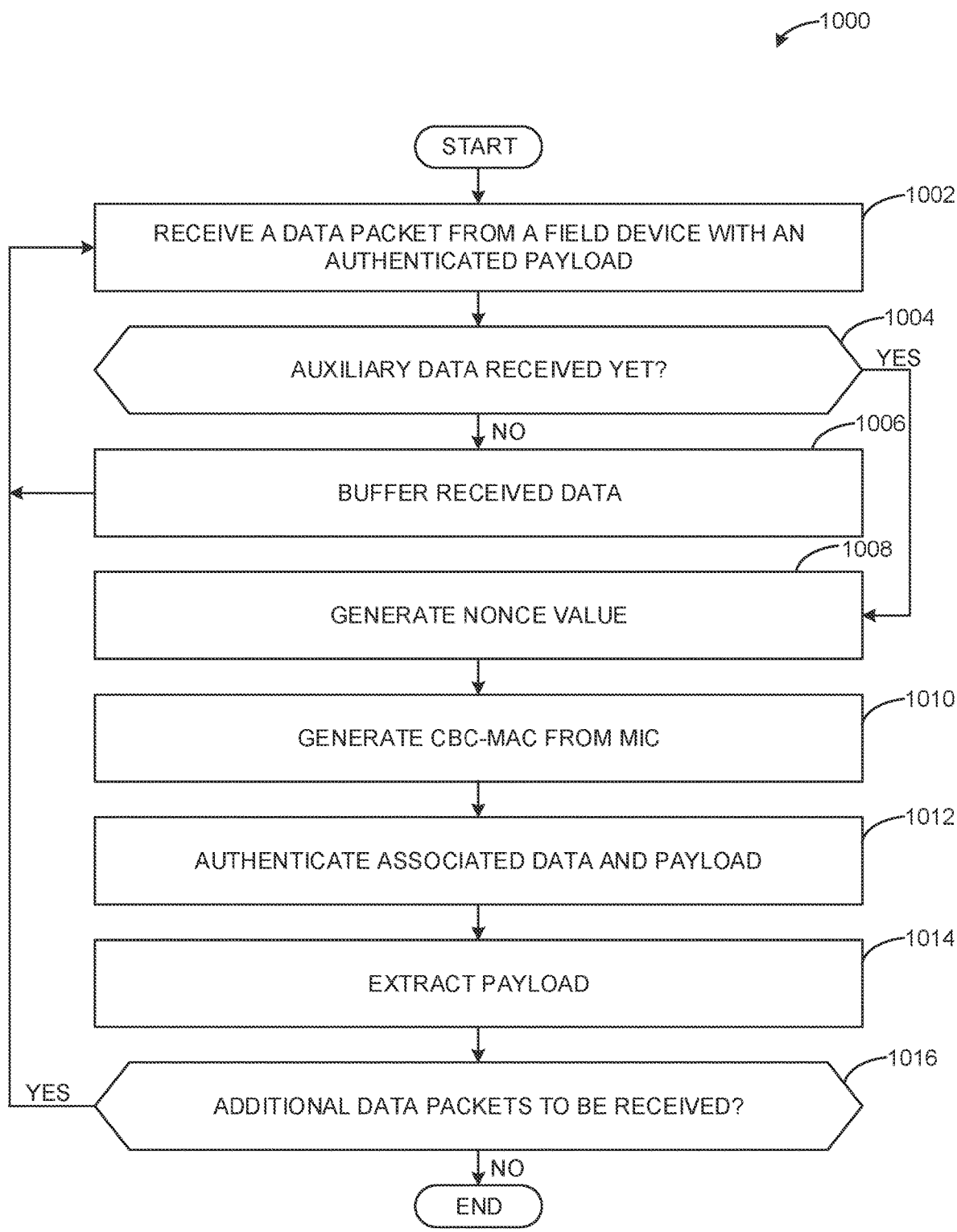
FIG. 10A is a flowchart representative of machine readable instructions that may be executed to implement the example remote device BLE bridge of FIGS. 1-4 to extract process data from an authenticated payload.
Figure 10B:
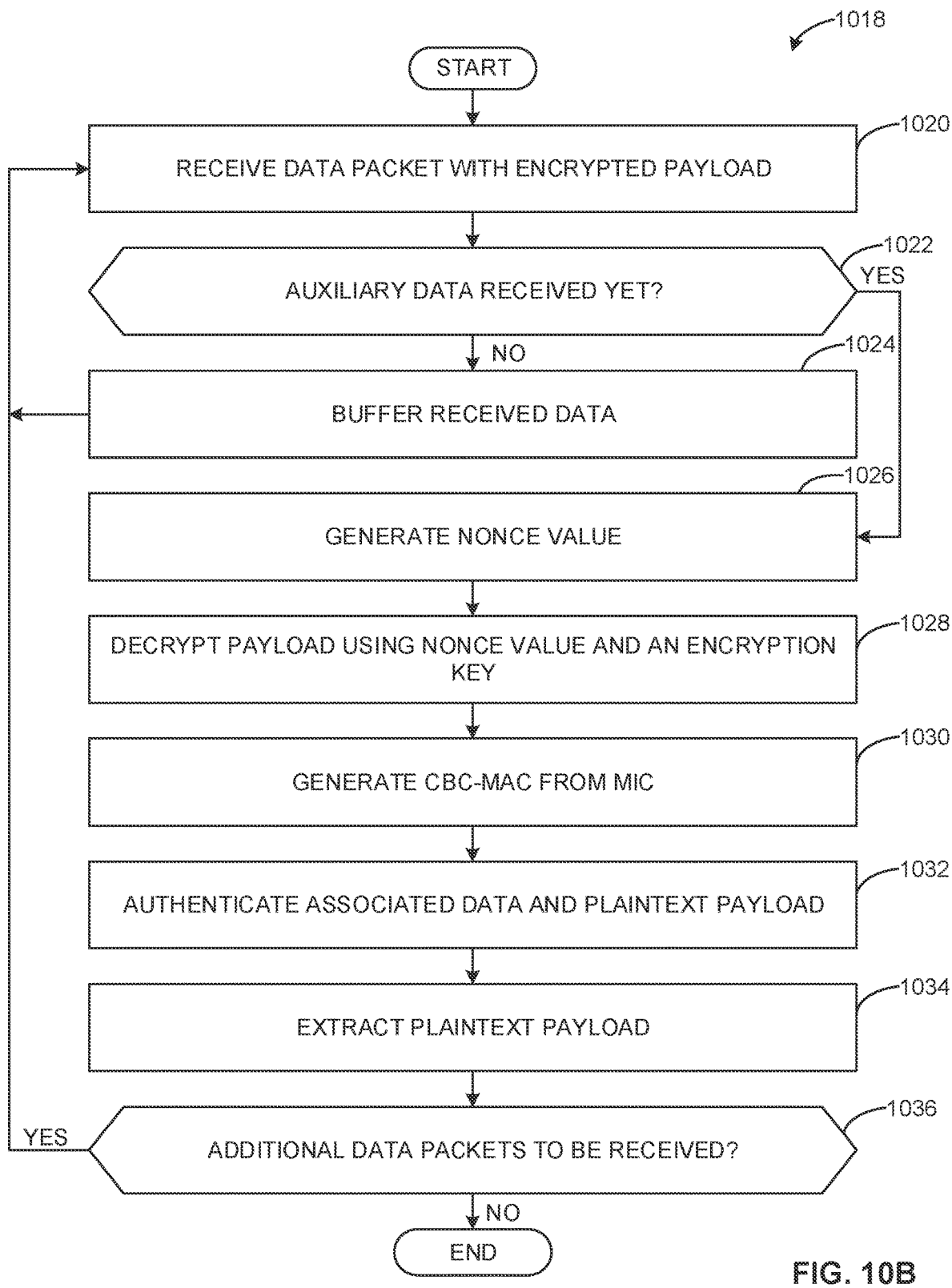
FIG. 10B is a flowchart representative of machine readable instructions that may be executed to implement the example remote device BLE bridge of FIGS. 1-4 to extract process data from an encrypted payload.
Figure 10C:
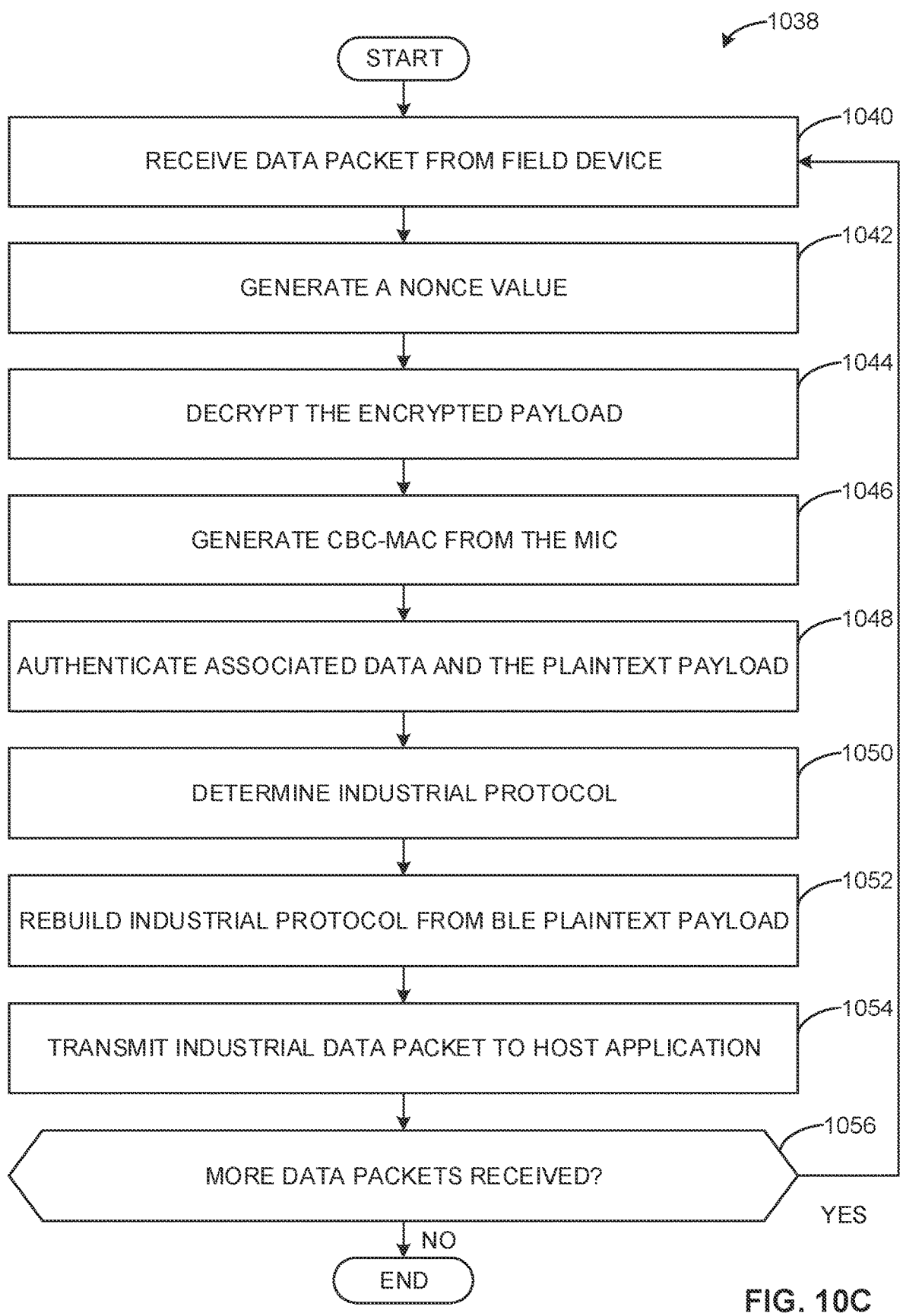
FIG. 10C is a flowchart representative of machine readable instructions that may be executed to implement the example remote device BLE bridge of FIGS. 1-4 to extract process data from a payload transmitted via a direct connection.

Flowcharts representative of example hardware logic, machine readable instructions, hardware implemented state machines, and/or any combination thereof for implementing the remote device BLE bridge 110 of FIG. 4 is shown in FIGS. 10A-10C. The machine readable instructions may be an executable program or portion of an executable program for execution by a computer processor such as the processor 1212 shown in the example processor platform 1200 discussed below in connection with FIG. 12. The program may be embodied in software stored on a non-transitory computer readable storage medium such as a CD-ROM, a floppy disk, a hard drive, a DVD, a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowchart illustrated in FIGS. 10A-10C, many other methods of implementing the example remote device BLE bridge 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 10A-10C may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 10A is a flowchart representative of machine readable instructions that may be executed to implement the example remote device BLE bridge 110 of FIGS. 1-4 to extract process data from an authenticated payload (e.g., the example payload 600 of FIG. 6). The example process 1000 begins at block 1002 where the remote device BLE bridge 110 receives a data packet (e.g., the example ATT protocol packet 500 of FIG. 5) from a field device (e.g., the field device 102 of FIGS. 1-4) with an authenticated payload. For example, the BLE stack handler 404 of FIG. 4 may receive a data packet (e.g., the ATT protocol packet 500) having an authenticated payload (e.g., a payload included in the authenticated plaintext 610 that was transmitted (e.g., broadcast) by the field device 102 over the BLE network 322 via the BLE interface 408 of FIG. 4. In such an example, the BLE stack handler 404 may direct the data packet to the platform manager 402 of FIG. 4 upon receiving the data packet.

At block 1004, the remote device BLE bridge 110 determines whether auxiliary data has been received. For example, the security manager 414 may analyze the example ATT payload 522 of FIG. 5 to determine whether the ATT payload 522 includes auxiliary data (e.g., based on the auxiliary bit 628 of FIG. 6). In some examples, the security manager 414 analyzes the flags 602 to determine the value of the auxiliary bit 628. In such examples, a value of 1 for the auxiliary bit 628 indicates that the data packet includes auxiliary data that is to be analyzed by, for example, the security manager 414. On the other hand, a value of 0 for the auxiliary bit 628 indicates that auxiliary data is not included in the ATT payload 522. In some examples, the security manager 414 previously received auxiliary data that can be used for the received data packet (e.g., from a data packet previously received by the remote device BLE bridge 110). When the remote device BLE bridge 110 determines that the security manager 414 has received auxiliary data, control proceeds to block 1008. When the remote device BLE bridge 110 determines that the security manager 414 has not received auxiliary data, control of process 1000 proceeds to block 1006.

At block 1006, the remote device BLE bridge buffers received data. For example, when the security manager 414 has not received the auxiliary data, the security manager 414 may store the data packet in the example database 406 of FIG. 4 until auxiliary data is received. In such examples, the auxiliary data allows the security manager 414 to process the data packet and extract the payload 600.

At block 1008, the remote device BLE bridge 110 generates a nonce value (e.g., the nonce value 700 of FIG. 7). For example, the security manager 414 of FIG. 4 can generate the nonce value 700 based on the flags 602, an initialization vector (e.g., as discussed in connection with FIG. 7), and/or the counter 608 of FIG. 6. In some examples, the security manager 414 generates the nonce value 700 based on the direction bit 620 and the source bit 622 from the flags 602, the initialization vector, and the counter 608 (e.g., as discussed in connection with FIG. 7).

At block 1010, the remote device BLE bridge 110 generates a CBC-MAC from a MIC (e.g., the MIC 614 of FIG. 6). For example, security manager 414 may generate the CBC-MAC by decrypting the MIC 614 using the example CCM mode encryption method 800 of FIG. 8A. In some examples, the security manager 414 uses the nonce value 700 generated at block 1008 and the MIC 614 as an input into the CCM mode encryption method 800 to output the CBC-MAC.

The remote device BLE bridge 110 further authenticates associated data (e.g., the associated data 604) and the payload 600 (block 1012). For example, the security manager 414 uses the MAC to authenticate the associated data 604, including the flags 602, the counter 608, and the authenticated plaintext 610 (e.g., which includes the payload 600) using the CBC-MAC method 812 discussed in connection with FIG. 8B. The MAC thus determines that the flags 602, the counter 608, and the authenticated plaintext 610 have not been manipulated, malformed, etc., during transmission (e.g., from the field device 102 to the remote device 106). The remote device BLE bridge 110 further extracts the payload 600 (block 1014). For example, the security manager 414 extracts the payload 600 after the associated data 604 (e.g., including the flags 602, the counter 608, and the authenticated plaintext 610) have been authenticated. The extracted payload 600 can then be stored in the database 406 and/or transmitted to host application 418 of FIG. 4.

At block 1016, the remote device BLE bridge 110 determines whether additional data packets are to be received. For example, the BLE interface 408 of FIG. 4 determines whether additional data packets are received at the remote device 106. When additional data packets are received at the remote device 106 by the BLE interface 408, control of process 1000 returns to block 1002. When no additional data packets are to be received, the process 1000 concludes.

FIG. 10B is a flowchart representative of machine readable instructions that may be executed to implement the example remote device BLE bridge 110 of FIGS. 1-4 to extract process data from an encrypted payload 810. The example process 1018 begins at block 1020 where the remote device BLE bridge 110 receives a data packet (e.g., the ATT protocol packet 500 of FIG. 5) with an encrypted payload (e.g., the ATT payload 522 of FIG. 5 where the payload 600 of FIG. 6 is included within the authenticated encryption data 612). For example, the BLE stack handler 404 of FIG. 4 may receive the ATT protocol packet 500 having an authenticated and encrypted payload (e.g., a payload included in the authenticated encryption data 612) that was transmitted (e.g., broadcast) by the field device 102 over the BLE network 322. In such an example, the BLE stack handler 404 may direct the ATT protocol packet 500 from the BLE interface 408 to the platform manager 402 of FIG. 4 upon receiving the ATT protocol packet 500.

The remote device BLE bridge 110 further determines whether auxiliary data has been received yet (block 1022). For example, the security manager 414 may analyze the example ATT payload 522 of FIG. 5 to determine whether the ATT payload 522 includes auxiliary data (e.g., based on the auxiliary bit 628 of FIG. 6). In some examples, the security manager 414 analyzes the flags 602 to determine the value of the auxiliary bit 628. In such examples, a value of 1 for the auxiliary bit 628 indicates that the data packet includes auxiliary data (e.g., as plaintext) that is to be analyzed by, for example, the security manager 414. On the other hand, a value of 0 for the auxiliary bit 628 indicates that auxiliary data is not included in the ATT payload 522. In some examples, the security manager 414 previously received auxiliary data that can be used for the received data packet (e.g., from a data packet previously received by the remote device BLE bridge 110). When the remote device BLE bridge 110 determines that the security manager 414 has received auxiliary data, control proceeds to block 1026. When the remote device BLE bridge 110 determines that the security manager 414 has not received auxiliary data, control of process 1018 proceeds to block 1024.

At block 1024, the remote device BLE bridge 110 buffers received data. For example, when the security manager 414 has not received the auxiliary data, the security manager 414 may store the data packet in the example database 406 of FIG. 4 until auxiliary data is received. In such examples, the auxiliary data allows the security manager 414 to process the data packet and extract the payload 600. The remote device BLE bridge 110 further generates a nonce value (e.g., the nonce value 700 of FIG. 7) (block 1026). For example, the security manager 414 of FIG. 4 can generate the nonce value 700 based on the flags 602, an initialization vector (e.g., as discussed in connection with FIG. 7), and/or the counter 608 of FIG. 6. In some examples, the security manager 414 generates the nonce value 700 based on the direction bit 620 and the source bit 622 from the flags 602, the initialization vector, and the counter 608 (e.g., as discussed in connection with FIG. 7).

The remote device BLE bridge 110 further decrypts the payload 600 using the nonce value 700 and an encryption key (block 1028). For example, the security manager 414 can decrypt the payload using the nonce value 700 and an encryption key identified using an encryption key identifier (e.g., included in the auxiliary data). In some examples, the security manager 414 uses the CCM mode encryption method 800 of FIG. 8A to decrypt the payload 600. At block 1030, the remote device BLE bridge 110 generates a CBC-MAC from a MIC (e.g., the MIC 614 of FIG. 6). For example, the security manager 414 can use the CCM mode encryption method 800 of FIG. 8A to decrypt the MIC 614 (e.g., included in the ciphertext 606 of FIG. 6). In some such examples, the decryption process includes the nonce value 700 and the encryption key used to decrypt the payload (e.g., at block 1028).

At block 1032, the remote device BLE bridge 110 authenticates the associated data 604 and the plaintext payload 600 (e.g., the payload 600 in plaintext form after the decryption process at block 1028). For example, the security manager 414 can generate a MAC for the associated data 604 (e.g., the flags 602 and the counter 608) using the CBC-MAC method 812 and the payload 600 and can compare the value of the MAC generated using the CBC-MAC method 812 to the MAC generated by decrypting the MIC 614. If the values of two MACs match, the security manager 414 confirms the authenticity of the payload 600. On the other hand, if the two values do not match, the security manager 414 may reject the ATT protocol packet 500.

The remote device BLE bridge 110 further extracts a plaintext payload (e.g., the payload 600 after decryption and authentication). For example, the security manager 414 can access the plaintext data included in the payload 600 and store the plaintext data in the database 406 of FIG. 4. Further, the security manager 414 can transmit the extracted payload 600 to the example host application 418 of FIG. 4 for further processing. At block 1036, the remote device BLE bridge 110 determines whether additional data packets are to be received. For example, the BLE interface 408 can determine whether additional data packets are received at the remote device 106. When additional data packets are to be received at the remote device 106 by the BLE interface 408, control of process 1018 returns to block 1020. When no additional data packets are to be received, the process 1018 concludes.

FIG. 10C is a flowchart representative of machine readable instructions that may be executed to implement the example remote device BLE bridge 110 of FIGS. 1-4 to extract process data from a payload (e.g., the payload 600 of FIG. 6) transmitted via a direct connection. The example process 1038 begins at block 1040, where the remote device BLE bridge 110 of the remote device 106 of FIGS. 1-4 receives a data packet (e.g., the ATT protocol packet 500 of FIG. 5) from a field device (e.g., the field device 102 of FIGS. 1-4). For example, the BLE stack handler 404 of FIG. 4 may receive the ATT protocol packet 500 having an authenticated and encrypted payload (e.g., a payload included in the authenticated encryption data 612) that was transmitted by the field device 102 via a direct connection with the remote device 106. In such an example, the BLE stack handler 404 may direct the ATT protocol packet 500 from the BLE interface 408 to the platform manager 402 of FIG. 4 upon receiving the ATT protocol packet 500.

At block 1042, the remote device BLE bridge 110 generates a nonce value (e.g., the nonce value 700 of FIG. 7). For example, the security manager 414 of FIG. 4 may receive the data used to generate the nonce value 700 during a handshake when the field device 102 and the remote device 106 initialized the direct connection. In some such examples, the field device 102 and the remote device share an initialization vector, an encryption key identifier, and/or other information. In some examples, the security manager 414 generates the nonce value 700 using the initialization vector (e.g., shared during the handshake), flags (e.g., the flags 602 of FIG. 6) included in associated data (e.g., the associated data 604 of FIG. 4) of the ATT payload (e.g., the ATT payload 522 of FIG. 5), and a counter (e.g., the counter 608 of FIG. 6) included in the associated data 604.

The remote device BLE bridge 110 further decrypts the encrypted payload 600 (e.g., the authenticated encryption data 612 of FIG. 6 included in the ciphertext 606 of FIG. 6). For example, the security manager 414 can decrypt the payload using the nonce value 700 and an encryption key identified using an encryption key identifier (e.g., shared during the handshake). In some examples, the security manager 414 uses the CCM mode encryption method 800 of FIG. 8A to decrypt the payload 600. At block 1046, the remote device BLE bridge 110 generates a CBC-MAC from a MIC (e.g., the MIC 614 of FIG. 6). For example, the security manager 414 can use the CCM mode encryption method 800 to decrypt the MIC 614 (e.g., included in the ciphertext 606 of FIG. 6). In some such examples, the decryption process includes the nonce value 700 and the encryption key used to decrypt the payload (e.g., at block 1044).

At block 1048, the remote device BLE bridge 110 authenticates the associated data 604 and the plaintext payload (e.g., the payload 600 in plaintext form after the decryption process at block 1044). For example, the security manager 414 can generate a MAC for the associated data 604 (e.g., the flags 602 and the counter 608) using the CBC-MAC method 812 and the payload 600. In such examples, the security manager 414 can compare the value of the MAC generated using the CBC-MAC method 812 to the MAC generated by decrypting the MIC 614. If the values of two MACs match, the security manager 414 confirms the authenticity of the payload 600. On the other hand, if the two values do not match, the security manager 414 may reject the ATT protocol packet 500.

The remote device BLE bridge 110 further determines an industrial protocol (block 1050). For example, the protocol handler 412 of FIG. 4 can determine an industrial protocol associated with the data packet (e.g., used by the field device MCU 318 of FIG. 3). In some examples, the industrial protocol is used by the host application 418 of FIG. 4 during further processing of the data packet. At block 1052, the remote device BLE bridge 110 rebuilds the industrial protocol from a BLE plaintext payload. For example, the protocol handler 412 can build an industrial protocol (e.g., a HART protocol, a PROFIBUS protocol, etc.) using the plaintext payload 600 (e.g., authenticated at block 1048) and adding components of the industrial protocol (e.g., a HART preamble, a HART address, etc.) around the payload 600.

The remote device BLE bridge 110 further transmits the industrial data packet to the host application 418 (block 1054). For example, when the protocol handler 412 has rebuilt the industrial protocol using the payload 600, the industrial data packet can be transmitted to the host application 418 for further processing. In such examples, the host application 418 can access the payload 600 from within the industrial protocol packet when the industrial protocol packet is formatted according to an application-specific industrial protocol. At block 1056, the remote device BLE bridge 110 determines whether more data packets have been received. For example, the BLE interface 408 determines whether more data packets have been received and transmits the received data packets to the security manager 414. When the remote device BLE bridge 110 determines that more data packets have been received, control of the process 1038 returns to block 1040. When the remote device BLE bridge 110 determines that no more data packets have been received, the process 1038 concludes.

Figure 11:
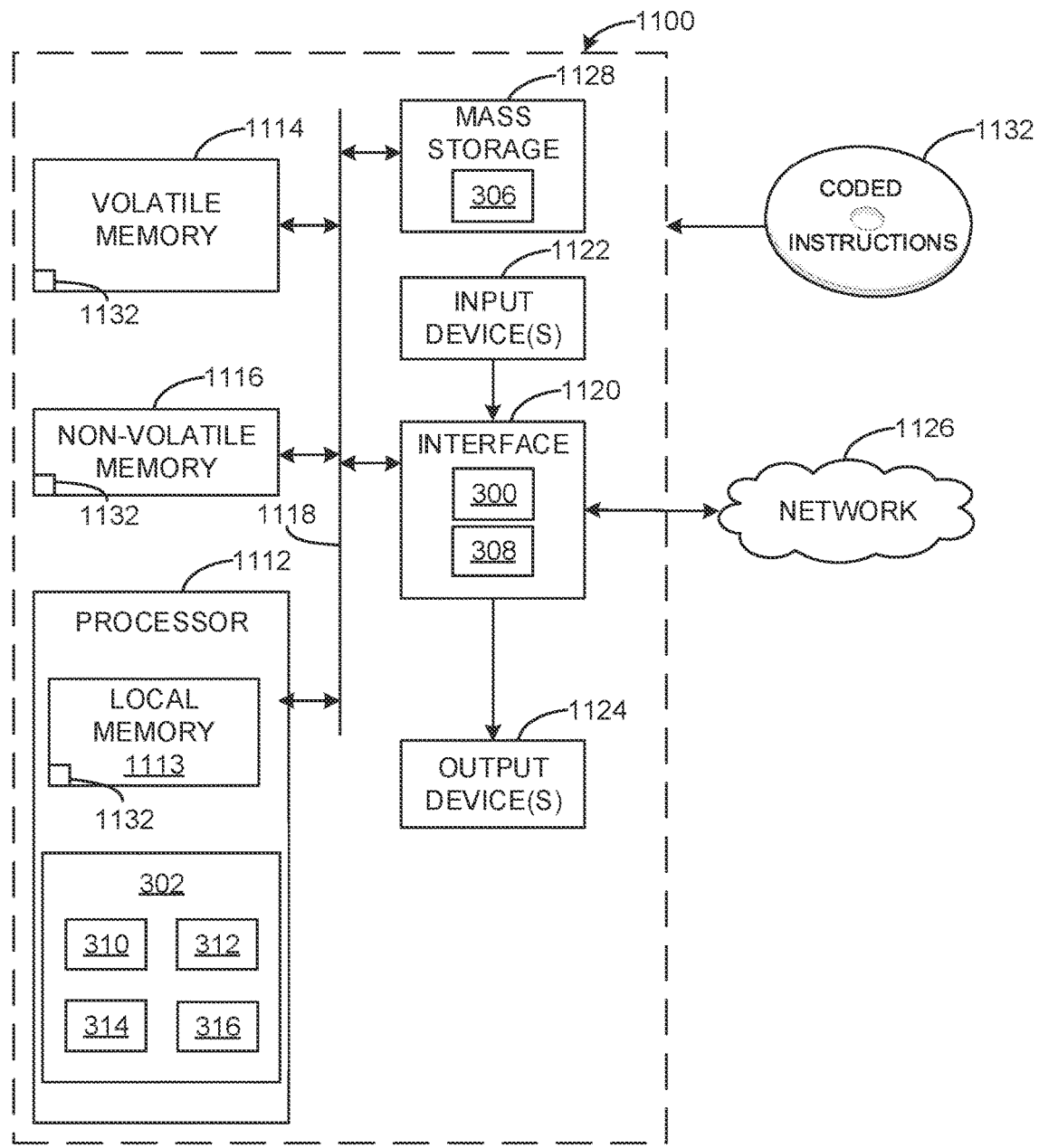
FIG. 11 is a block diagram of an example processor platform structured to execute machine readable instructions to implement the methods of FIGS. 9A-9D and/or the example field device BLE bridge of FIGS. 1-4 to implement the examples disclosed herein.

FIG. 11 is a block diagram of an example processor platform structured to execute machine readable instructions to implement the methods of FIGS. 9A-9D and/or the example field device BLE bridge 104 of FIGS. 1-3 to implement the examples disclosed herein. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example platform manager 302, the example command processor 310, the example protocol handler 312, the example security manager 314, and the example RX/TX interface handler 316 of FIG. 3.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface. In the illustrated example, the interface circuit 1120 includes the example receiver transmitter interface 300 and the example BLE interface 308 of FIG. 3.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives. In the illustrated example, the mass storage devices 1128 include the example database 306 of FIG. 3.

The machine executable instructions 1132 of FIGS. 9A-9D may be stored in the mass storage device 1128, in the volatile memory 1114, in the non-volatile memory 1116, and/or on a removable non-transitory computer readable storage medium such as a CD or DVD.

Figure 12:
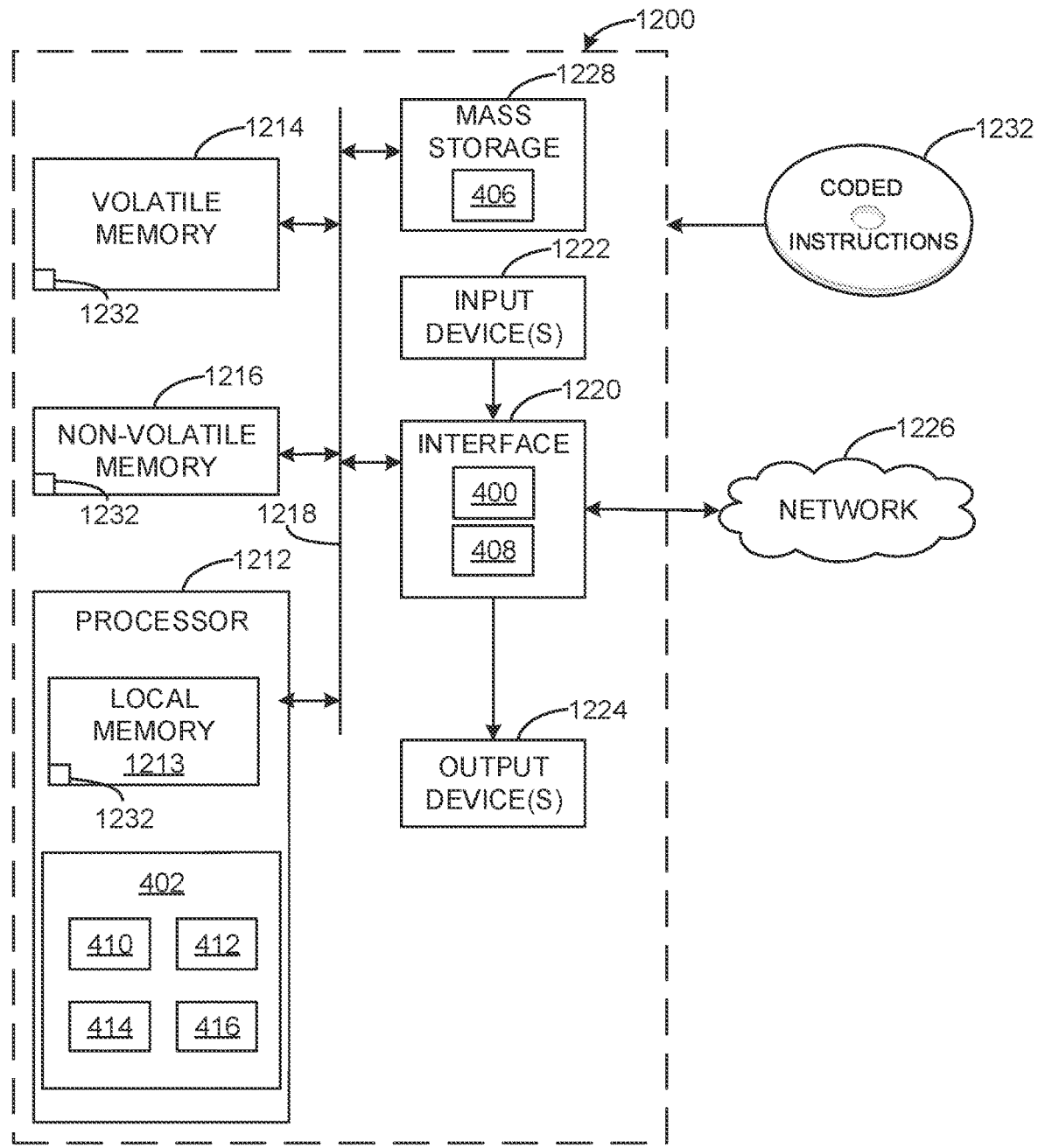
FIG. 12 is a block diagram of an example processor platform structured to execute machine readable instructions to implement the method of FIGS. 10A-10C and/or the example remote device BLE bridge of FIGS. 1-4 to implement the examples disclosed herein.

FIG. 12 is a block diagram of an example processor platform structured to execute machine readable instructions to implement the method of FIGS. 10A-10C and/or the example remote device BLE bridge 110 of FIGS. 1-4 to implement the examples disclosed herein. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example platform manager 402, the example command processor 410, the example protocol handler 412, the example security manager 414, and the example RX/TX interface handler 416 of FIG. 4.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface. In the illustrated example, the interface circuit includes the example RX/TX interface 400 and the example BLE interface 408 of FIG. 4.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives. In the illustrated example, the mass storage devices 1228 include the example database 406 of FIG. 4.

The machine executable instructions 1232 of FIGS. 10A-10C may be stored in the mass storage device 1228, in the volatile memory 1214, in the non-volatile memory 1216, and/or on a removable non-transitory computer readable storage medium such as a CD or DVD.

From the foregoing, it will be appreciated that example methods, apparatus and articles of manufacture have been disclosed that broadcast data packets in a process control environment. The examples disclosed herein facilitate a transmission of information over a BLE network from a field device to a remote device. In some examples, the BLE bridge of the field device encrypts the payload and/or adds a message authentication code (MAC) to the data packet prior to transmission to the remote device. In some disclosed examples, a remote device includes a remote device BLE bridge that can receive, authenticate, and/or decrypt the payload of the data packet. When the data packet has been authenticated and/or the payload has been decrypted, the remote device BLE bridge is able to extract process data (e.g., process data associated with a process control system) from the payload.

The disclosed methods, apparatus and articles of manufacture improve functionality of a computing device by securely broadcasting data in a process control environment while avoiding the problems of extensibility, interoperability, continuous maintenance, etc., that are typically encountered when using BLE for broadcast transmissions. The examples disclosed herein further eliminate the need for maintaining and updating tables by transmitting process data as plaintext. Further, in some examples, client field devices may transmit proprietary information from a field device associated with the client to a remote device associated with the same client. This proprietary information is protected from interference by other clients within the process control system because of the authentication and/or encryption of the data packet. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to obtain process data associated with a process control system received from a field device, the method comprising:
   in response to receiving a data packet, identifying, at a computing device, associated data and a payload included in the data packet, the associated data including a source bit;
   determining, at the computing device, a type of connection between the field device and the computing device based on the source bit;
   determining, at the computing device, an encryption key identifier and an initialization vector based on an auxiliary data packet received prior to the data packet;
   generating, at the computing device, a nonce value based on the source bit and the initialization vector, the nonce value indicative of an input to a data encryption algorithm used by the field device to encrypt the payload; and
   extracting, at the computing device, the process data associated with the process control system from the payload using the data encryption algorithm based on the encryption key identifier and the nonce value.

2. The method of claim 1, wherein the data packet further includes a message integrity check (MIC), the computing device to decrypt the MIC to generate a message authentication code (MAC) for the payload and the associated data.

3. The method of claim 2, further including determining whether the payload or the associated data has been altered based on the MAC.

4. The method of claim 1, wherein the associated data further includes a direction bit to indicate a direction of transmission of the data packet.

5. The method of claim 4, wherein generating the nonce value is further based on the direction bit.

6. The method of claim 1, wherein the associated data further includes a counter used to generate the nonce value.

7. The method of claim 1, further including:
adding, at the computing device, a protocol address to the payload corresponding to an industrial communication protocol; and
generating, at the computing device, a message including the payload and the protocol address, the message corresponding to a data packet formatted according to the industrial communication protocol.

8. The method of claim 7, further including transmitting the message to a host application running on the computing device.

9. A tangible computer readable storage medium comprising instructions that, when executed, cause a computing device to obtain process data associated with a process control system received from a field device, the computing device to at least:
in response to receiving a data packet, identify associated data and a payload included in the data packet, the associated data including a source bit;
determine a type of connection between the field device and the computing device based on the source bit;
determine an encryption key identifier and an initialization vector based on an auxiliary data packet received prior to the data packet;
generate a nonce value based on the source bit and the initialization vector, the nonce value indicative of an input to a data encryption algorithm used by the field device to encrypt the payload; and
extract the process data associated with the process control system from the payload using the data encryption algorithm based on the encryption key identifier and the nonce value.

10. The tangible computer readable storage medium of claim 9, wherein the data packet further includes a message integrity check (MIC) and the instructions further cause the computing device to decrypt the MIC to generate a message authentication code (MAC) for the payload and the associated data.

11. The tangible computer readable storage medium of claim 10, wherein the instructions further cause the computing device to determine whether the payload or the associated data has been altered based on the MAC.

12. The tangible computer readable storage medium of claim 9, wherein the associated data further includes a direction bit to indicate a direction of transmission of the data packet.

13. The tangible computer readable storage medium of claim 12, wherein the computing device generates the nonce value based additionally on the direction bit.

14. The tangible computer readable storage medium of claim 9, wherein the instructions, when executed, further cause the computing device to:
add a protocol address to the payload corresponding to an industrial communication protocol; and
generate a message including the payload and the protocol address, the message corresponding to a data packet formatted according to the industrial communication protocol.

15. A system to obtain process data associated with a process control system received from a field device, the system comprising:
a field device to broadcast a data packet including a payload and associated data, the payload including process data associated with a process control system, the associated data including a source bit; and
a computing device to:
in response to receiving the data packet, identify the source bit and the payload included in the data packet;
determine a type of connection between the field device and the computing device based on the source bit;
determine an encryption key identifier and an initialization vector based on an auxiliary data packet received prior to the data packet;
generate a nonce value based on the source bit and the initialization vector, the nonce value indicative of an input to a data encryption algorithm used by the field device to encrypt the payload; and
extract the process data associated with the process control system from the payload using the data encryption algorithm based on the encryption key identifier and the nonce value.

16. The system of claim 15, wherein the data packet further includes a message integrity check (MIC) and the computing device is further to decrypt the MIC to generate a MAC for the payload and the associated data.

17. The system of claim 16, wherein the computing device is further to determine whether the payload or the associated data has been altered based on the MAC.

18. The system of claim 15, wherein the associated data further includes a direction bit to indicate a direction of transmission of the data packet.

19. The system of claim 18, wherein the computing device generates the nonce value based additionally on the direction bit.

20. The system of claim 15, wherein the computing device is further to:
add a protocol address to the payload corresponding to an industrial communication protocol; and
generate a message including the payload and the protocol address, the message corresponding to a data packet formatted according to the industrial communication protocol.

* * * * *